United States Patent [19]

Ishiguro

[11] Patent Number: 5,274,415

[45] Date of Patent: Dec. 28, 1993

[54] RANGE FINDER FOR PASSIVE TYPE AUTOFOCUSSING DEVICE

[75] Inventor: Minoru Ishiguro, Ohmiya, Japan

[73] Assignee: Fuji Photo Optical Co., Ltd., Ohmiya, Japan

[21] Appl. No.: 834,636

[22] Filed: Feb. 12, 1992

[30] Foreign Application Priority Data

Feb. 15, 1991 [JP]  Japan .................. 3-042417
Feb. 15, 1991 [JP]  Japan .................. 3-042418
Feb. 22, 1991 [JP]  Japan .................. 3-048721
Feb. 22, 1991 [JP]  Japan .................. 3-048722
Feb. 22, 1991 [JP]  Japan .................. 3-048723
Feb. 22, 1991 [JP]  Japan .................. 3-048724
Feb. 22, 1991 [JP]  Japan .................. 3-048725

[51] Int. Cl.$^5$ .................. G03B 13/18; G03B 3/10
[52] U.S. Cl. .................. 354/402
[58] Field of Search .............. 354/402, 406, 407

[56] References Cited

U.S. PATENT DOCUMENTS 4,373,791  2/1983  Araki .................. 354/402
4,575,626  3/1986  Dinoue et al. .......... 354/407 X
4,616,264  10/1986 Pshtissky .............. 354/407
5,070,353  12/1991 Komiya et al. ......... 354/402

Primary Examiner—Michael L. Gellner
Assistant Examiner—Jae N. Noh
Attorney, Agent, or Firm—Price, Heneveld, Cooper, DeWitt & Litton

[57] ABSTRACT

A range finder for a passive type autofocussing device includes three photosensors comprising three line sensors. Differences of the luminance distribution of a scene detected by the respective photosensors are computed and the zero-cross points of the difference are detected. The zero-cross behaviors thus detected are compared to one another with the zero-cross behavior associated with one of the three line sensors being selected as a reference and the zero-cross behaviors associated with the other two line sensors being successively shifted relative to said reference until a coincidence of the zero-cross behaviors associated with the three line sensors is detected. The range to the scene is computed based on an amount that the zero-cross behaviors associated with the other two line sensors has to be shifted until coincidence is detected.

22 Claims, 29 Drawing Sheets

FIG. 7
(a) 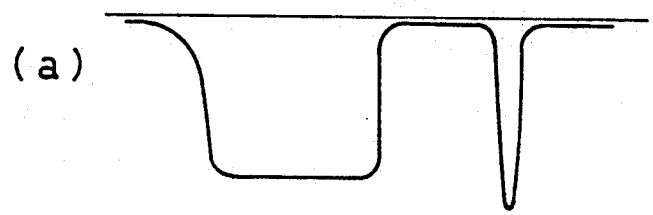
(b) 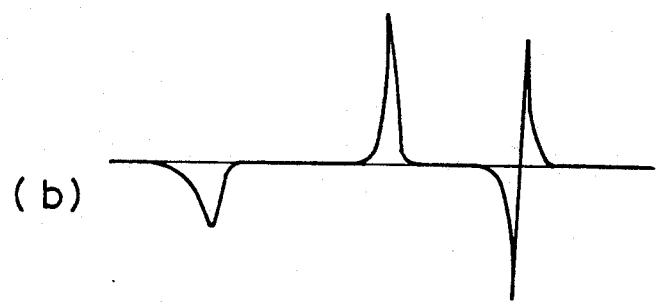
(c) 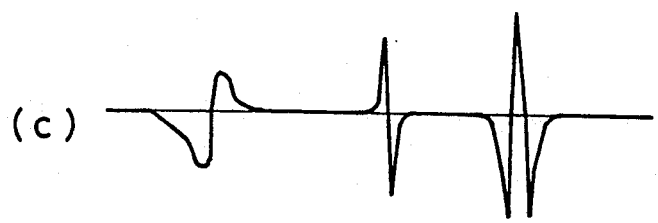

FIG. 15
P1 
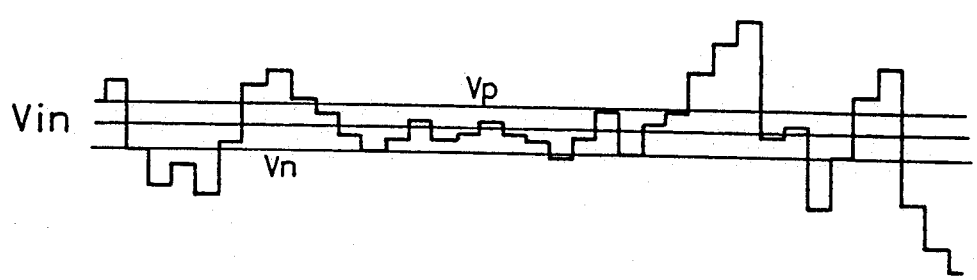
p 
n 
P2 
N-ZERO 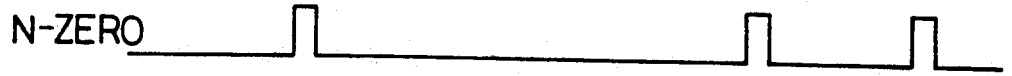
P-ZERO 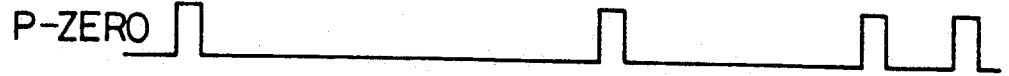

FIG. 17
P1 
Vin 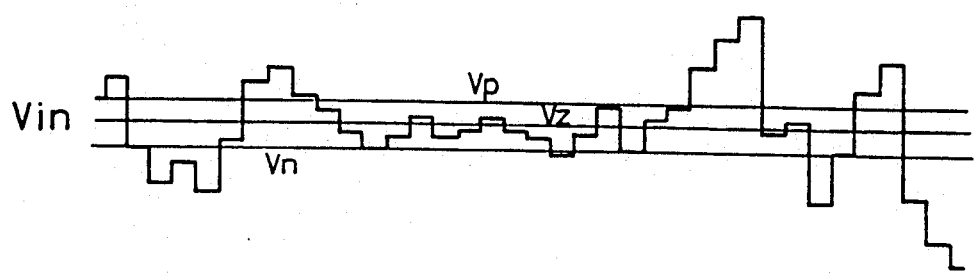
p 
z 
n 
P2 
N-ZERO 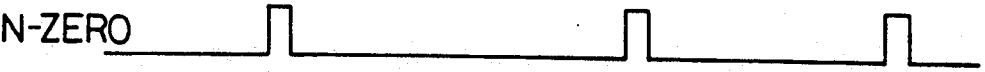
P-ZERO 

FIG. 22
P1 
Vin 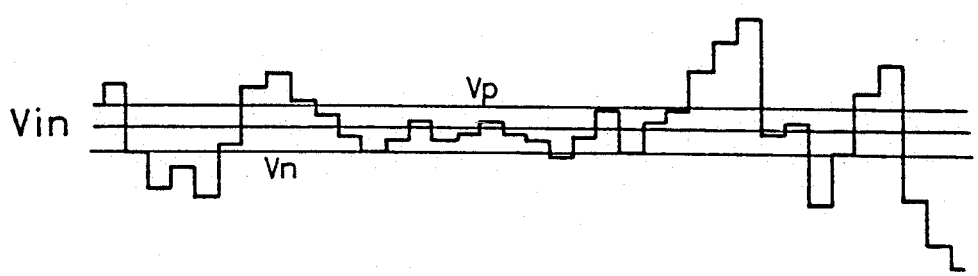
p 
n 
P2 
N-ZERO 
P-ZERO 

FIG. 23
P1 
Vin 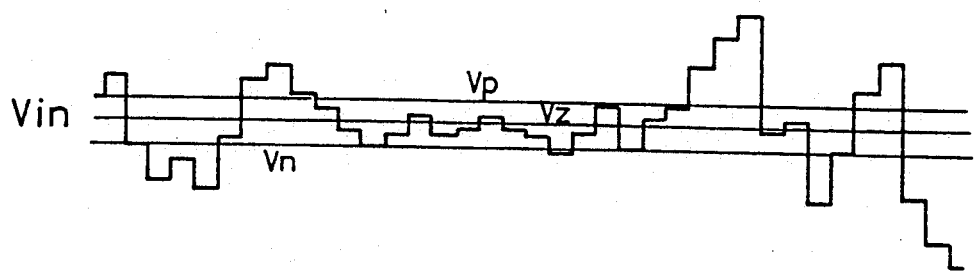
p 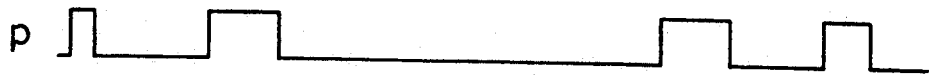
z 
n 
P2 
N-ZERO 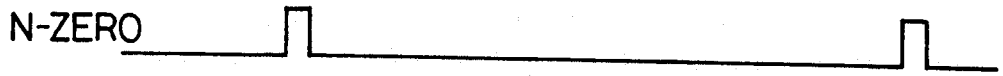
P-ZERO 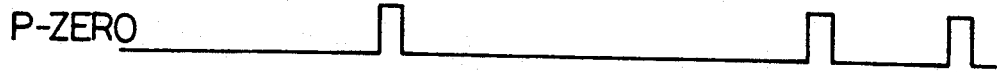

RANGE FINDER FOR PASSIVE TYPE AUTOFOCUSSING DEVICE

BACKGROUND OF THE INVENTION

1. Technical Field

This invention relates to a range finder for passive type autofocussing device so arranged that light rays emitted from a scene to be photographed are picked up to find a range to said scene and the objective is adjustably brought into focus based on a result of said range finding.

2. Prior Art

The autofocussing device is used to find a shooting range for photographic camera or the like in automatic mode and to bring the objective into focus based on a result of the range finding and such autofocussing device allows everyone to enjoy photographing easily. Various types of autofocussing device have already been developed and most of them employ the trigonometrical range finding method. Typical autofocussing device relying on this trigonometrical range finding method is so-called passive type autofocussing device adapted to pick up light rays emitted from the scene by photosensors provided on the camera and thereby to find a shooting range.

Some of the passive type autofocussing devices include a pair of photosensors. However, if the scene includes two objects being in contrast with each other, such range finder provided with a pair of photosensors disadvantageously indicates two different states of the single scene to be photographed and consequently can not achieve a reliable range finding, necessarily resulting in a picture which is out of focus.

To assure a reliable range finding and thereby to obtain a well-focused picture, the applicant of this application has previously proposed a range finding mechanism comprising three photodetector arrays (Japanese Patent Application No.1989-177382, Japanese Patent Application Disclosure No.1991-42642). A principle of range finding by this range finding mechanism will be described in reference with FIGS. 32 and 33 of the attached drawing. The range finding mechanism comprises a reference photosensor 1, a first photosensor 2 and a second photosensor 3. These photosensors 1, 2, 3 comprise, in turn, imaging lenses 1a, 2a, 3a and photodetector arrays 1b, 2b, 3b, respectively, so that a scene to be photographed is imaged through the imaging lenses 1a, 2a, 3a on the photodetector arrays 1b, 2b, 3b, respectively. FIG. 32 illustrates a case in which the scene P comprises a single object. Now, referring to FIG. 32, $x_0$ represents a displacement of an output signal $P_0$ relating to a luminance distribution on the object P detected by the reference photodetector array 1b with respect to an optical axis $T_0$ of the reference photosensor 1, $x_1$ represents a displacement of an output signal $P_1$ relating to a luminance distribution on the object P detected by the first photodetector array 2b with respect to an optical axis $T_1$ of the first photosensor 2, and $x_2$ represents a displacement of an output signal $P_2$ relating to a luminance distribution on the object P detected by the second photodetector array 3b with respect to an optical axis $T_2$ of the second photosensor 3. These displacements $x_0$, $x_1$, $x_2$ represents phase differences relating to the luminance distribution on the object detected by the photodetector arrays 1b, 2b, 3b, respectively. Assume that the optical axes $T_0$, $T_1$, $T_2$ are spaced from one another by B, photodetective surfaces of the photodetector arrays 1b, 2b, 3b are spaced from the respective imaging lenses 1a, 2a, 3a by A, and the object P lies at a distance Lp from the imaging lenses 1a, 2a, 3a and at a distance X from the optical axis $T_0$, the following equation is derived from the principle of trigonometrical survey:

$$X = x_0 * LP/A \quad (1)$$

If a direction in which the output signal image appears with respect to the optical axis $T_0$ is taken into account, $$-x_1 = (B-X)/Lp * A \quad (2)$$

$$x_2 = (B+X)/Lp * A \quad (3)$$

If the equation (1) is substituted for these equations (2), (3), respectively, $$x_1 = (B/Lp) * A + x_0 \quad (4)$$

$$x_2 = (B/Lp) * A + x_0 \quad (5)$$

Comparison of the equations (4) and (5) indicates that $x_1$ and $x_2$ are displaced with respect to a reference $x_0$, respectively, by an amount $$(B/Lp) * A = Xp \quad (6)$$

Accordingly, this Xp may be obtained to compute $$Lp = A * B/Xp \quad (7)$$

Procedure used to obtain said Xp will be explained in reference with FIG. 33. Referring to FIG. 33, (a) illustrates output signals relating to the luminance distribution detected by the photodetector arrays 1b, 2b, 3b exposed to light rays emitted from two objects with respect to reference output signals $P_0$, $Q_0$. From the state of (a), the output signal waveforms $P_1$, $P_2$ may be shifted with respect to said output waveform $P_0$ until these output signal waveforms $P_0$, $P_1$, $P_2$ coincide with one another to obtain an amount of said displacement Xp. More specifically, at this moment of coincidence, $P_1$ and $P_2$ have been displaced by an equal amount. Accordingly, when said three output signal waveforms coincide with one another after the output signal of the photodetector array 2b and the output signal of the photodetector array 3b have been shifted by an equal amount, the waveforms of these three output signals will provide the data relating to the same object P. Next, as illustrated by (c), the output signal $Q_1$, $Q_2$ may be shifted with respect to the output signal $Q_0$ until said output signal $Q_1$, $Q_2$ coincide with the output signal $Q_0$ to obtain an amount of the displacement Xq.

Based on said Xp, Xq obtained in the manner as has been described above, the ranges Lp, Lq to the objects P, Q, respectively, are computed according to said equation (7).

SUMMARY OF THE INVENTION

However, the above-mentioned range finding procedure of prior art principally comprises steps of computing a correlation between the output signal of the reference photodetector array 1b and the output signal of the first photodetector array 2b, then computing a correlation between the output signal of the reference photodetector array 1b and the output signal of the second photodetector array 3b and finally detecting a coincidence of the output signal waveforms of the reference photodetector array 1b, the first photodetector array 2b and the second photodetector array 3b. As will be readily understood, such repeated computation of correlations necessary prolongs the signal processing time. In a consequence, a time taken for range finding becomes inconveniently longer and a dynamic object might be photographed out of focus, resulting in a blurred picture.

In view of the problem as has been mentioned above, it is a principal object of this invention to provide an improved range finder equipped with these photosensors, which allows signal processing to be rapidly performed and an optically focused picture to be obtained.

To achieve the object set forth above, the invention resides in a range finder for passive type autofocussing device, said range finder comprising three photosensors to pick up a luminance distribution of a scene to be photographed, secondary difference computing circuits to compute secondary difference of output signals from said respective photosensors, zero-cross detecting circuits to detect zero-cross points of output signals from said respective secondary difference computing circuits, zero-cross memory circuits in which the zero-cross behavior signals obtained by said respective zero-cross detecting circuits are stored, and a coincidence detecting circuit adapted to compare the zero-cross behavior signals stored in said respective zero-cross memory circuits with one another and thereby to detect a coincidence of these zero-cross behavior signals, wherein one of said three photosensors is selected as a reference photosensor and the zero-cross behavior signals obtained from the other two photosensors are successively slid relative to the zero-cross behavior signal obtained from shifted reference photosensor until a coincidence of these zero-cross behavior signals is detected by said coincidence detecting circuit and a range to the scene is computed from an amount of said shifting.

With such arrangement, photodetector arrays constituting said photosensors provide output voltages corresponding to the luminance distribution on the scene and secondary difference distributions of the respective output voltages behave across the respective zero levels. For the luminance distribution on the same portion of the scene, the zero-cross behaviors associated with said three photosensors become same but with some displacement relative to a given reference. An amount of this displacement corresponds to an amount by which said coincidence detecting circuit has shifted the zero-cross behavior signal waveforms until a coincidence thereof is detected. Based on this amount of shifting, a range to the scene can be computed according to the principle of trigonometrical survey.

The invention resides also in a range finder for passive type autofocussing device, said range finder comprising a photosensor to pick up a luminance distribution on a scene to be photographed, said photosensor consisting of a single line sensor divided into three sections and three imaging lenses adapted to image the scene on the respective sections of the line sensor, a single secondary difference computing circuit to compute a secondary difference of an output signal from said line sensor, a single zero-cross detecting circuit to detect a zero-cross point of an output signal from said secondary difference computing circuit, zero-cross memory circuits associated with said three sections of said line sensor, respectively, to store zero-cross behavior signals obtained by said zero-cross detecting circuit, and a coincidence detecting circuit adapted to compare the zero-cross behavior signals stored in said respective zero-cross memory circuits and thereby to detect a coincidence thereof, wherein one of said three line sensor sections is selected as a reference line sensor section and the zero-cross behavior signals obtained from the other two line sensor sections are successively shifting relative to the zero-cross behavior signal obtained from said reference line sensor section until a coincidence of these zero-cross behavior signals is detected by said coincidence detecting circuit and a range to the scene is computed from an amount of said sliding.

This arrangement comprising a single line sensor, a single secondary difference computing circuit and a single zero-cross detecting circuit advantageously reduces the number of parts and simplifies the circuit construction.

Preferably, each said zero-cross detecting circuit is adapted to detect the zero-cross point of the output signal from each said secondary difference computing circuit discriminatively in the case of positive-to-negative change and in the case of negative-to-positive change.

Preferably, each said zero-cross detecting circuit is adapted to determine that the output signal from each said secondary difference computing circuit has zero-crossed if said output signal has changed over non-adjacent level zones of three or more level zones including two or more levels across the zero level and to detect the zero-cross point of said output signal discriminatively in the case of positive-to-negative change and in the case of negative-to-positive change.

Preferably, each said zero-cross detecting circuit is adapted to determine whether the output signal of each said secondary difference computing circuit is in positive or negative state across the zero level, to determine that said output signal has zero-cross if said output signal has change from one state to the other state after said one state lasted for a predetermined number of pixels in the associated photosensor, and to detect the zero-cross point of said output signal discriminatively in the case of positive-to-negative change and in the case of negative-to-positive change.

Preferably, each said zero-cross detecting circuit is adapted to determine that the output signal of each secondary difference computing circuit has zero-crossed if said output signal has changed over non-adjacent level zones of three or more level zones including two or more levels across the zero level within a period corresponding to a predetermined number of pixels of the associated photosensor and to detect the zero-cross point of said output signal discriminatively in the case of positive-to-negative change and in the case of negative-to-positive change.

Further speed up of the coincidence detection is achieved, according to the invention, by a range finder for passive type autofocussing device, said range finder comprising three photosensors to pick up a luminance distribution on a scene to be photographed, secondary difference computing circuits to compute secondary differences of output signals from said respective photosensors, zero-cross detecting circuits to detect zero-cross points of output signals from said respective secondary difference computing circuits, zero-cross memory circuits to store zero-cross behavior signals obtained by said respective zero-cross detecting circuits in addresses assigned in association with said three photosensors, respectively, and a coincidence detecting circuit adapted to compare the zero-cross behavior signals stored in said respective zero-cross memory circuits with one another and thereby to detect a coincidence of these zero-cross behavior signals, wherein one of said three photosensors is selected as a reference photosensor; a data stored in one address of the zero-cross memory circuit associated with said reference photosensors is read out; if this data is a valid data including a zero-cross point, data stored in the other zero-cross memory circuits are read out while the addresses are shifted by one at a time to compare these three data; such comparison of these three data is successively performed with respect to all the addresses of said zero-cross memory circuit associated with the reference photosensor; and a range to the scene is computed based on the addresses of data stored in said other two memory circuits coinciding with the data stored in said zero-cross memory circuit associated with said reference photosensor.

Preferably, said three photosensors comprise a single line sensor divided into three sections and three imaging lenses each adapted to image the scene on the associated one of said three sections.

BRIEF DESCRIPTION OF THE DRAWING

FIG. 7 is a diagram showing the luminance distribution on the scene and primary and secondary differences therefor;

FIG. 15 is a time chart for the circuit of FIG. 14;

FIG. 17 is a time chart for the circuit of FIG. 16;

FIG. 22 is a time chart for the circuit of FIG. 14 and relating also to Embodiment 1.7;

FIG. 23 is a time chart for the circuit of FIG. 16 and relating also to Embodiment 1.8;

DETAILED DESCRIPTION OF THE INVENTION

Figure 12:
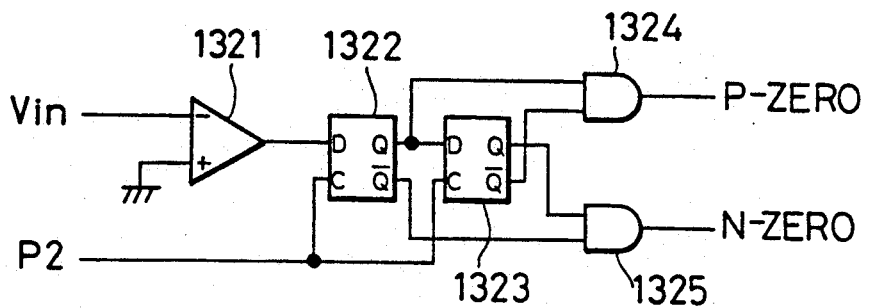
FIG. 12 is a circuit diagram showing the zero-cross detecting circuit in Embodiment 1.2, which is adapted to detect the zero-cross point from the secondary difference signal obtained by the secondary difference computing circuit.
Figure 13:
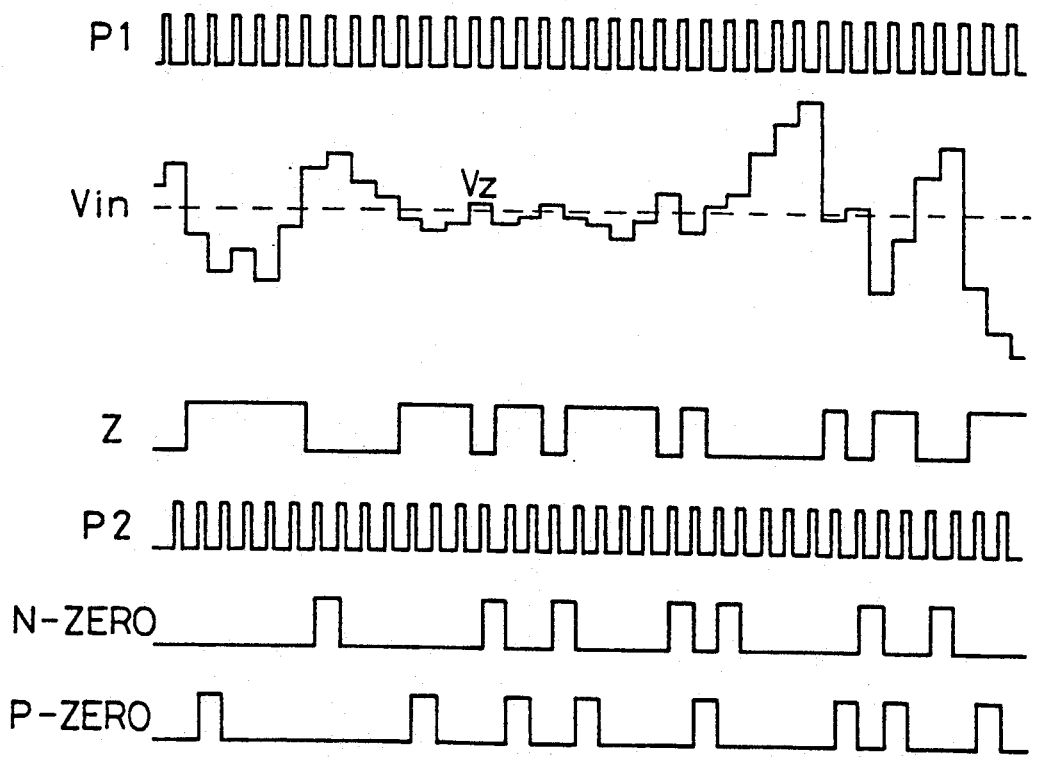
FIG. 13 is a time chart for the circuit of FIG. 12.
Figure 14:
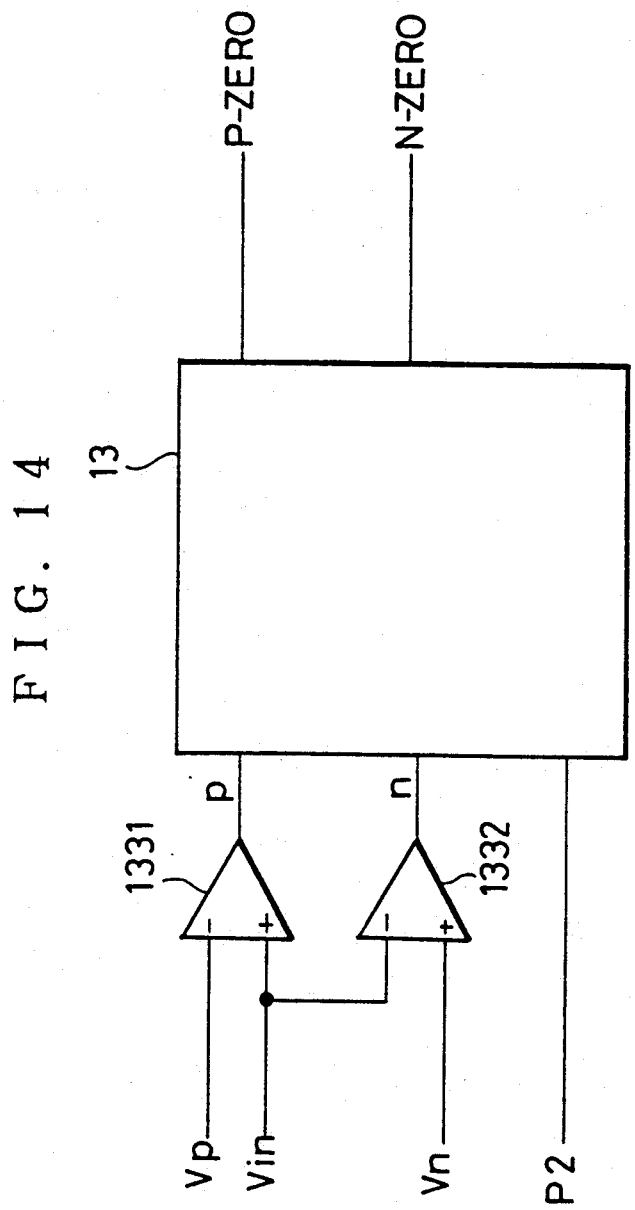
FIG. 14 is a circuit diagram showing the zero-cross detecting circuit in Embodiment 1.3, which is adapted to detect the zero-cross point from the secondary difference signal obtained by the secondary difference computing circuit.
Figure 16:
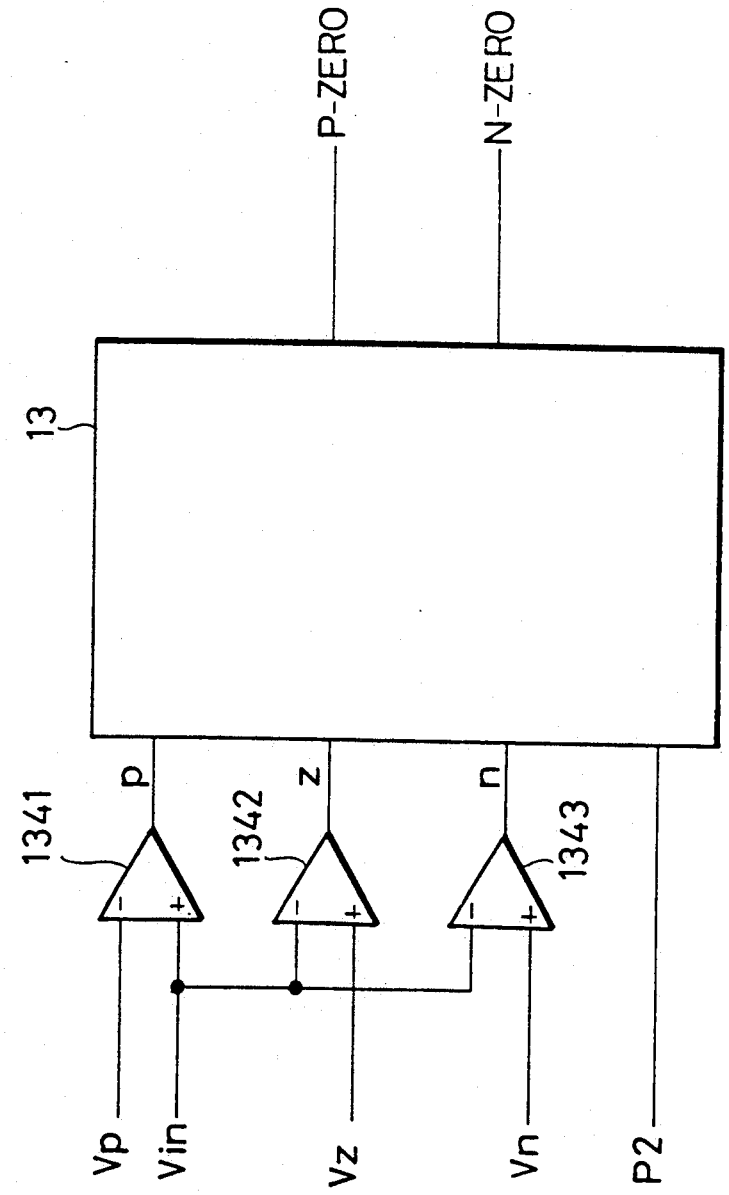
FIG. 16 is a circuit diagram showing the zero-cross detecting circuit in Embodiment 1.4, which is adapted to detect the zero-cross point from the secondary difference signal obtained by the secondary difference computing circuit.
Figure 18:
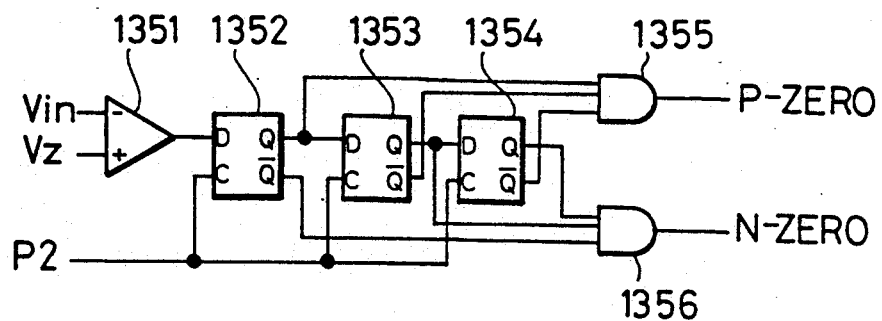
FIG. 18 is a circuit diagram showing the zero-cross detecting circuit in Embodiment 1.5, which is adapted to detect the zero-cross point from the secondary difference signal obtained by the secondary difference computing circuit.
Figure 19:
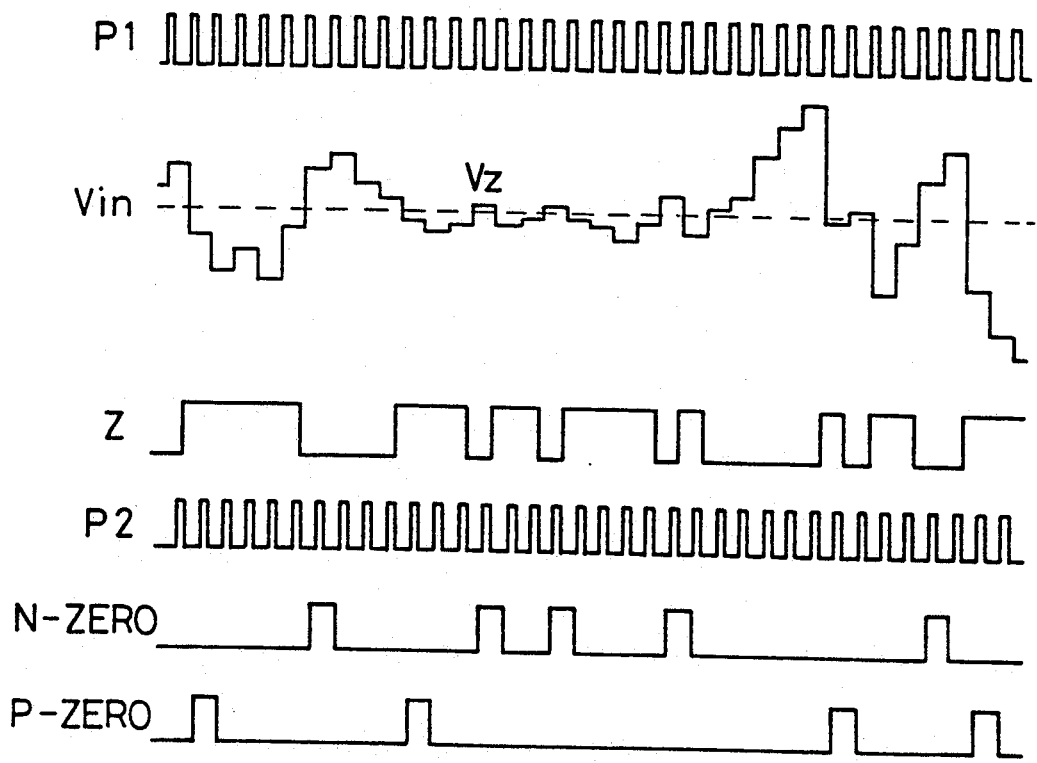
FIG. 19 is a time chart for the circuit of FIG. 18.
Figure 20:
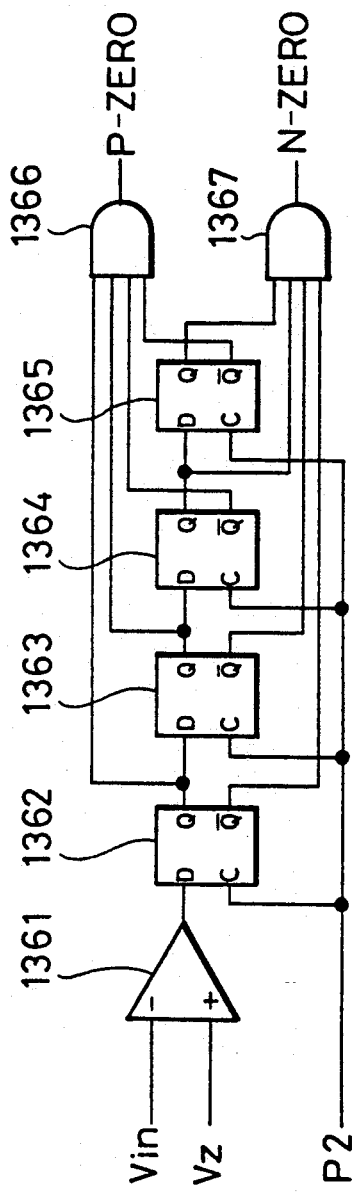
FIG. 20 is a circuit diagram showing the zero-cross detecting circuit in Embodiment 1.6, which is adapted to detect the zero-cross point from the secondary difference signal obtained by the secondary difference computing circuit.
Figure 21:
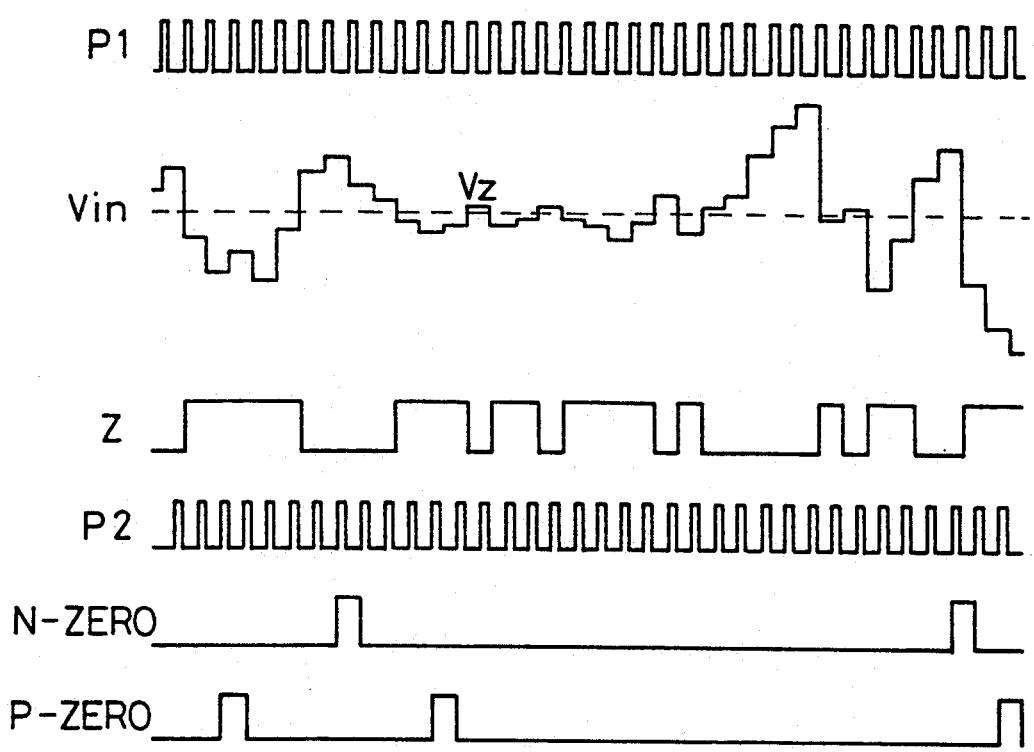
FIG. 21 is a time chart for the circuit of FIG. 20.
Figure 30:
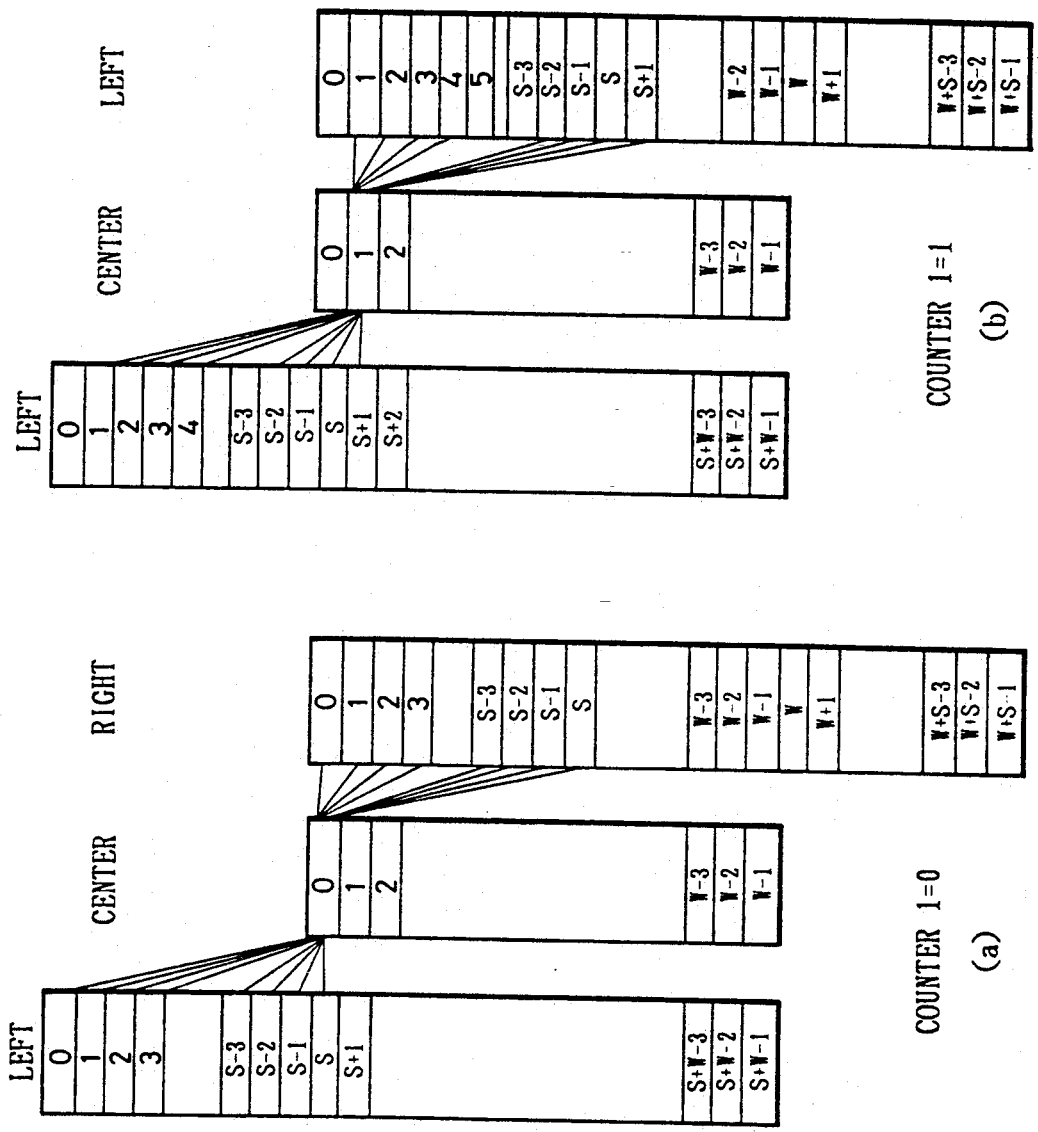
FIG. 30 is a diagram illustrating the procedure to read and compare the data stored in the zero-cross memory circuits according to the flow chart of FIG. 29.
Figure 31:
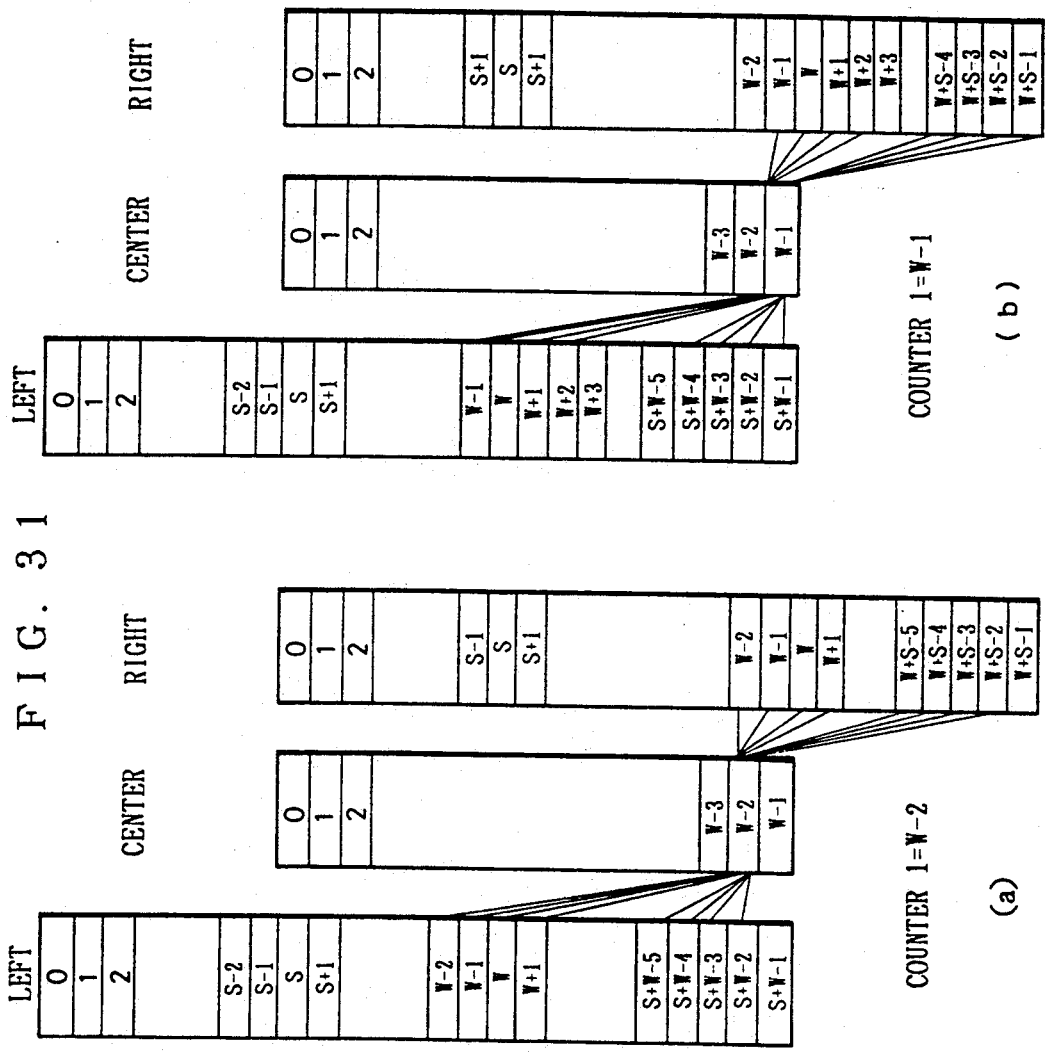
FIG. 31 is a diagram illustrating the procedure to read and compare the data stored in zero-cross memory circuits according to the flow chart of FIG. 29.
Figure 32:
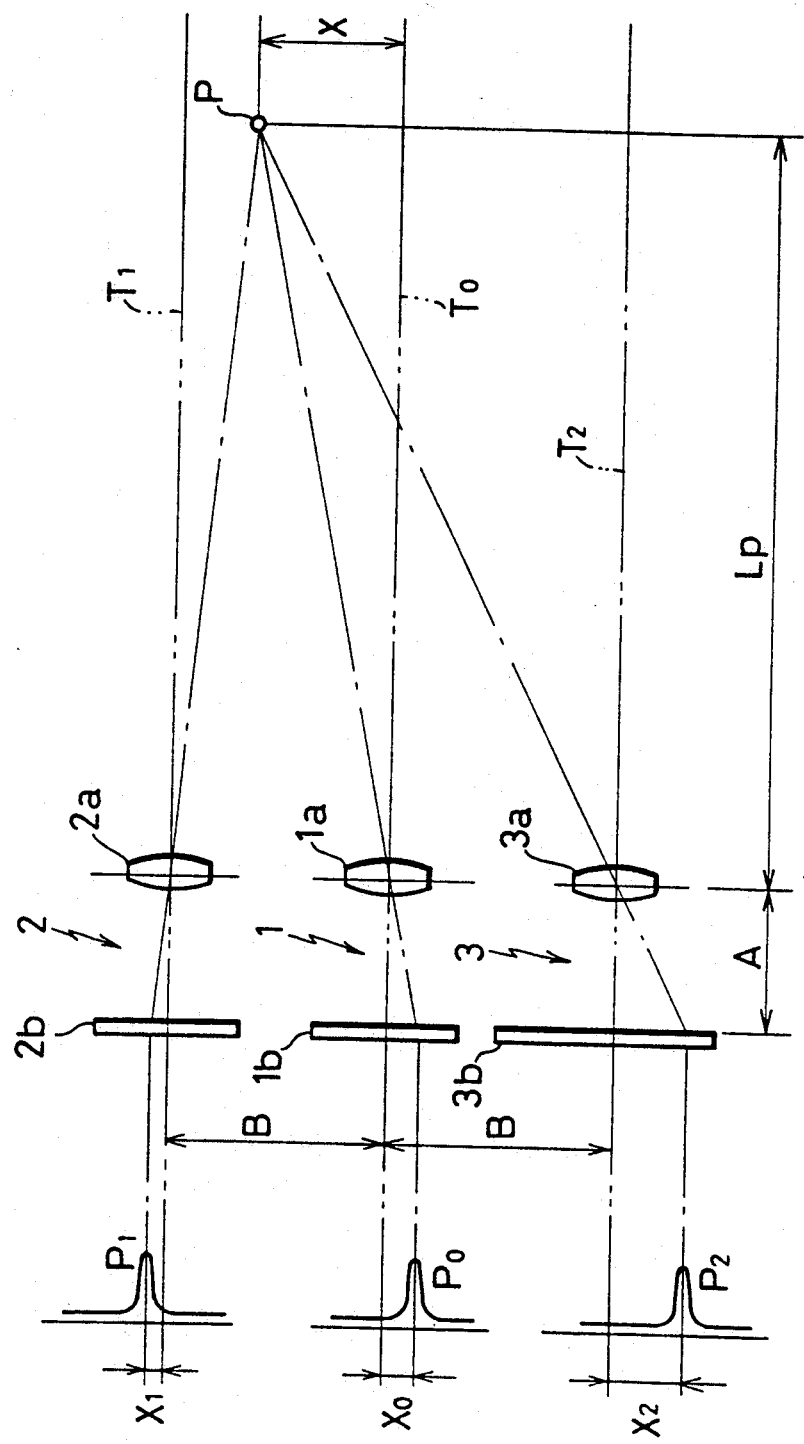
FIG. 32 is an optical path diagram illustrating a principle of range finding.
Figure 33:
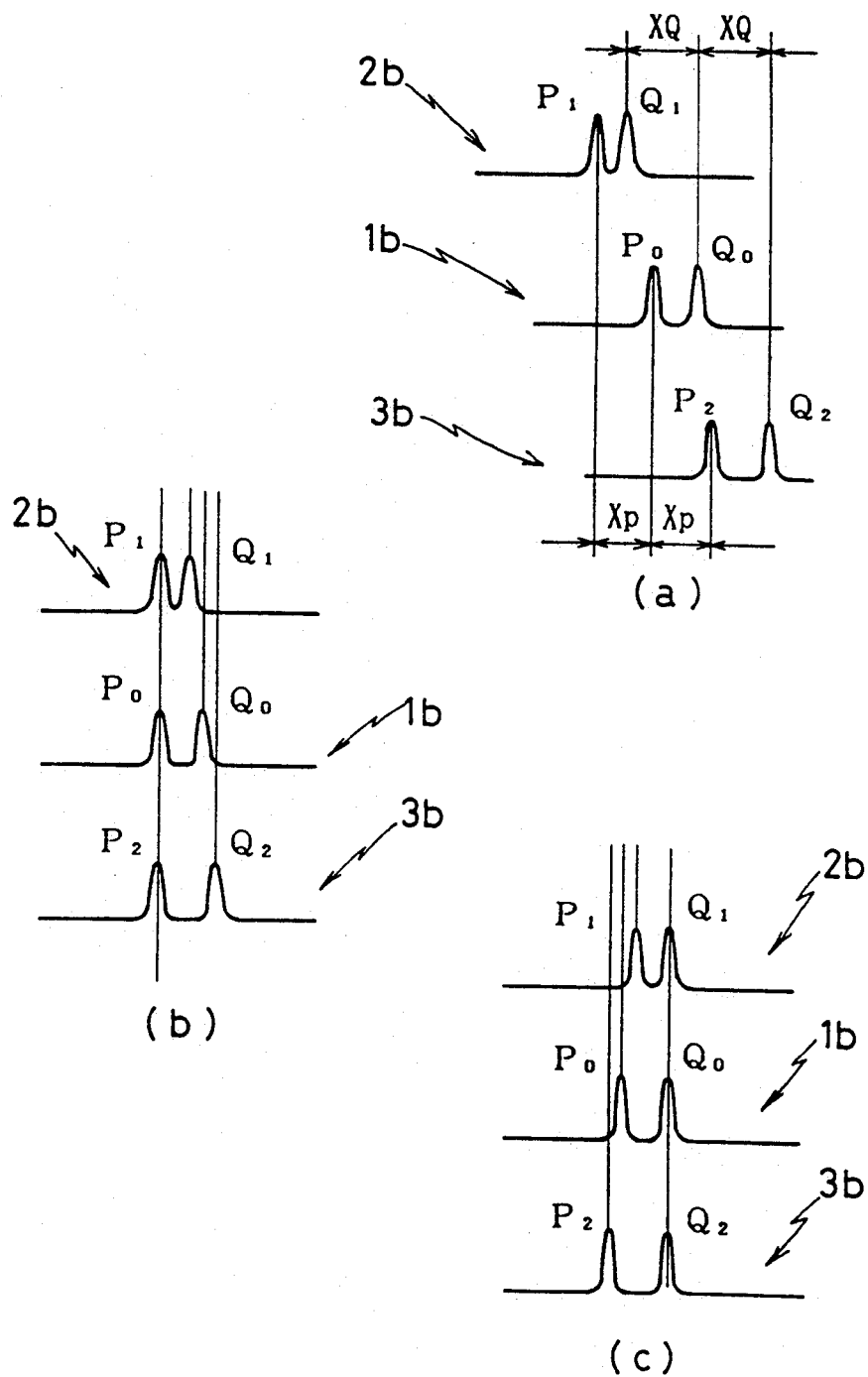
FIG. 33 is a signal diagram based on the luminance distribution of the scene detected by the photodetector arrays according to the principle of range finding.

The range finder for autofocussing device of the invention will be described more specifically in reference with the attached drawing. It should be understood that FIGS. 1 through 11 illustrate Embodiment 1.1; FIGS. 12 and 13 illustrate Embodiment 1.2; FIGS. 14 and 15 illustrate Embodiment 1.3; FIGS. 16 and 17 illustrate Embodiment 1.4; FIGS. 18 and 19 illustrate Embodiment 1.5; FIGS. 20 and 21 illustrate Embodiment 1.6; FIG. 22 illustrates Embodiment 1.7; and FIG. 23 illustrates Embodiment 1.8, these Embodiments being different from one another in their means for zero-cross detection; FIGS. 24 through 28 illustrate Embodiment 2 which is different from Embodiments 1.1 through 1.7 in their arrangement used to pick up the luminance distribution over the scene to be photographed; and FIGS. 29 through 31 illustrate Embodiment 3.

EMBODIMENT 1.1

Figure 2:
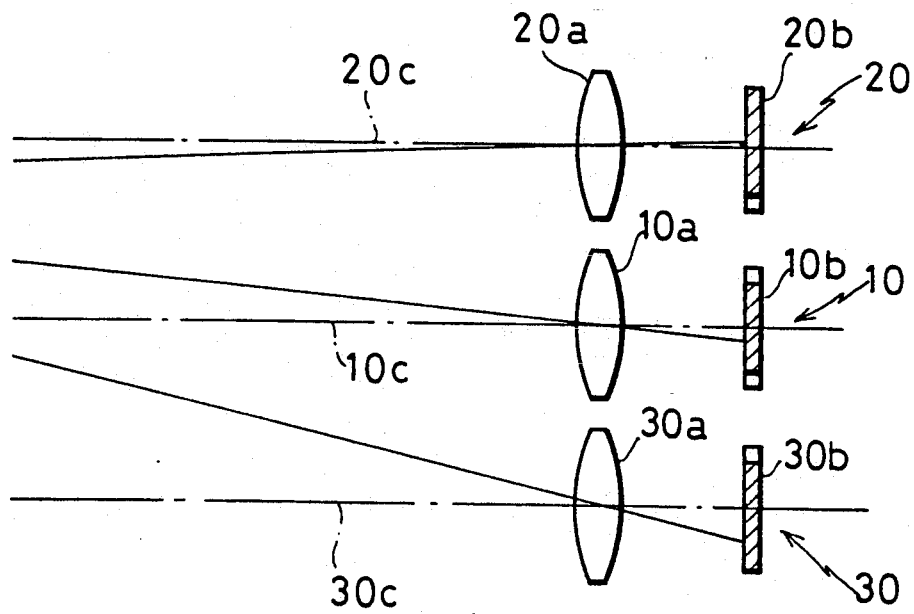
FIG. 2 is a side view schematically showing the Photosensors in Embodiments 1.1 through 1.8.

Photosensors 10, 20, 30 comprise line sensors which comprise, in turn, photodetector arrays each including an appropriate number of pixels arranged side by side, and imaging lenses combined with said line sensors. Referring to FIG. 2, there are provided on the front side of the photographic camera three imaging lenses 10a, 20a, 30a so that light rays emitted from a scene to be photographed pass through these imaging lenses 10a, 20a, 30a and the scene is imaged on respective line sensors 10b, 20b, 30b placed behind them. These photosensors 10, 20, 30 are designated here as the central censor 10, the right side sensor 20 and the left side sensor 30 with optical axes 20c, 30c of said right side sensor 20 and said left side sensor 30, respectively, being arranged symmetrically with respect to an optical axis 10c of the central sensor 10. Said line sensors 10b, 20b, 30b are designated here as the central line sensor 10b, the right side line sensor 20b and the left side line sensor 30b.

Figure 1:
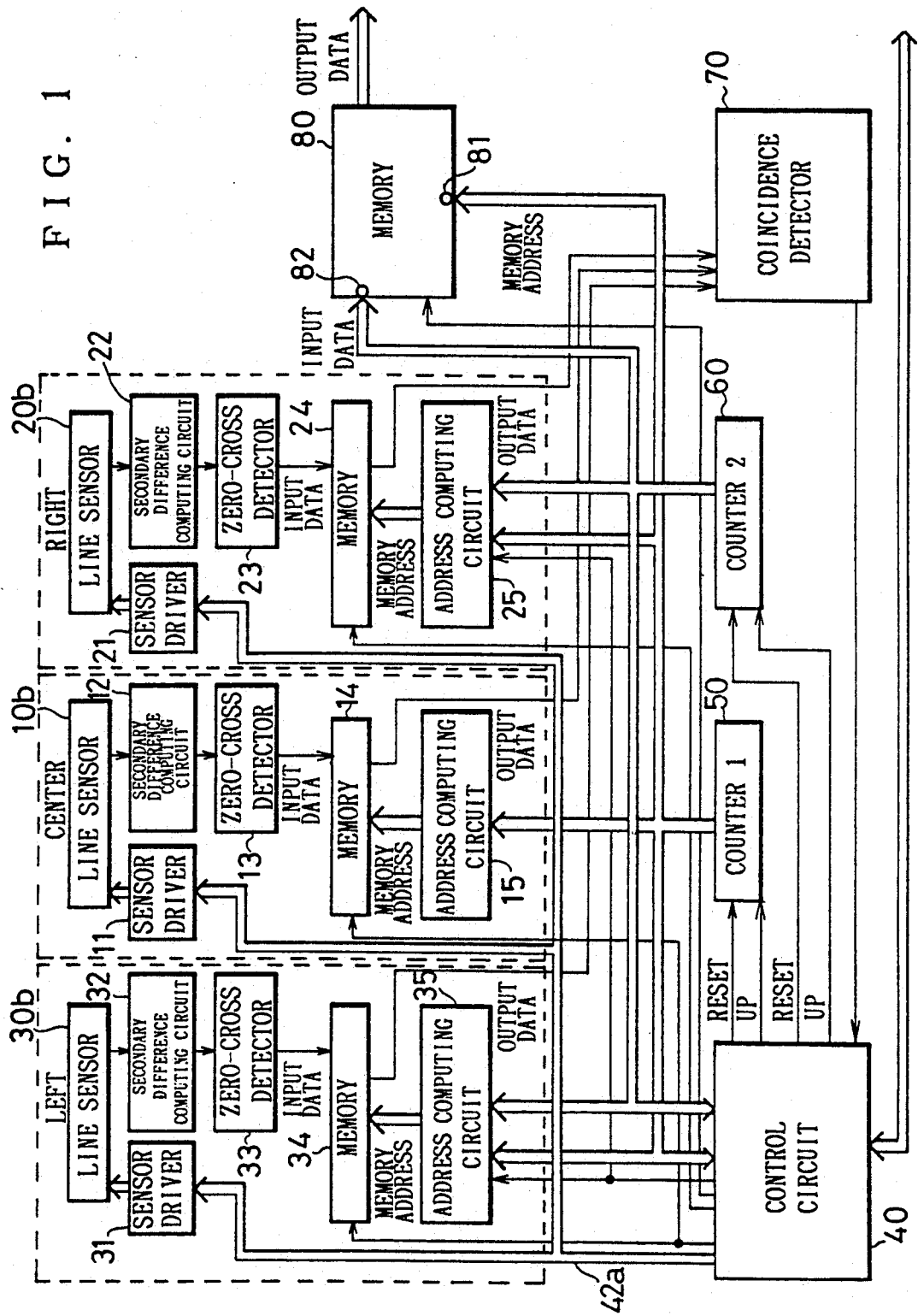
FIG. 1 is a block diagram showing Embodiments 1.1 through 1.8 of the range finder for passive type autofocussing device constructed in accordance with the invention.

Said line sensors 10b, 20b, 30b are separately applied, as illustrated in FIG. 1, with driver signals from respective sensor drivers 11, 21, 31 and begin to pick up the light rays coming from the scene on the basis of said driver signals. The sensor drivers 11, 21, 31 are connected to a control circuit 40 via a drive control signal link 40a and controlled by a drive control signal output from said control circuit 40.

Figure 3:
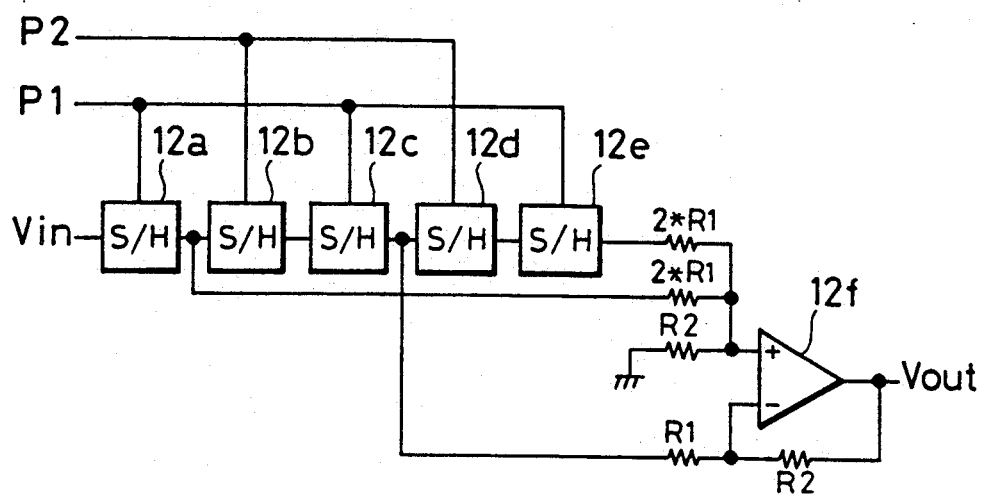
FIG. 3 is a circuit diagram showing the secondary difference computing circuit in Embodiments 1.1. through 1.8, which is adapted to compute the secondary difference from the output of the line sensor.
Figure 4:
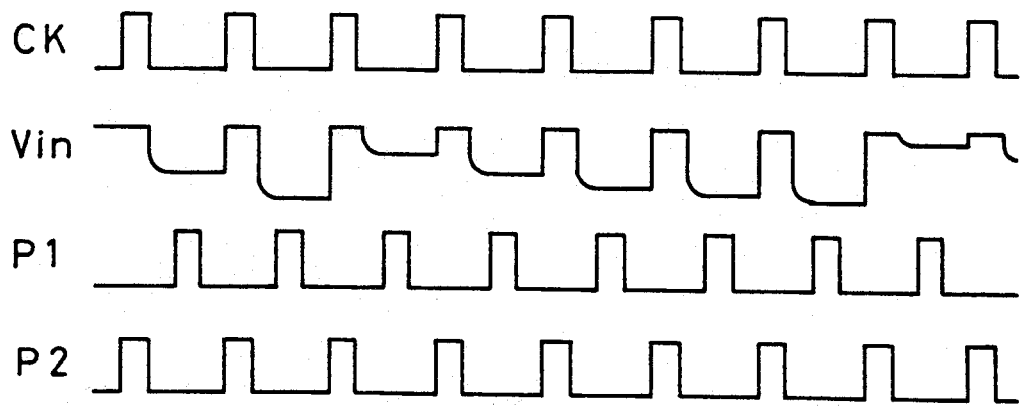
FIG. 4 is a time chart for the circuit of FIG. 3.
Figure 5:
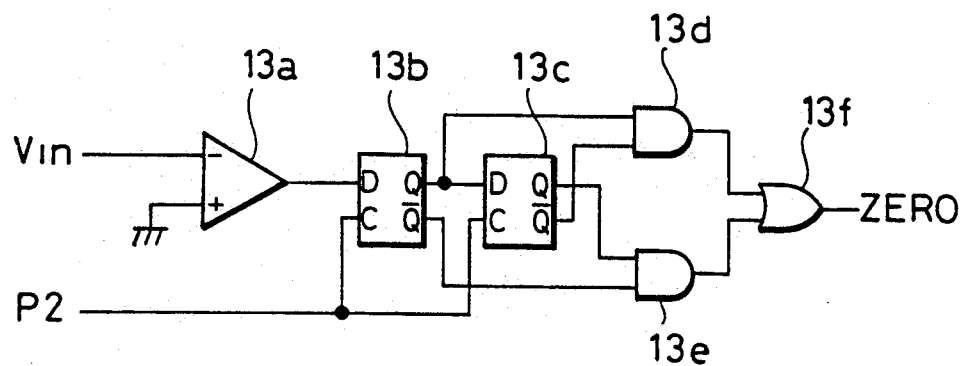
FIG. 5 is a circuit diagram showing the zero-cross detecting circuit in Embodiments 1.1 and 3, which is adapted to detect the zero-cross point from the secondary difference signal provided from the secondary difference computing circuit.
Figure 6:
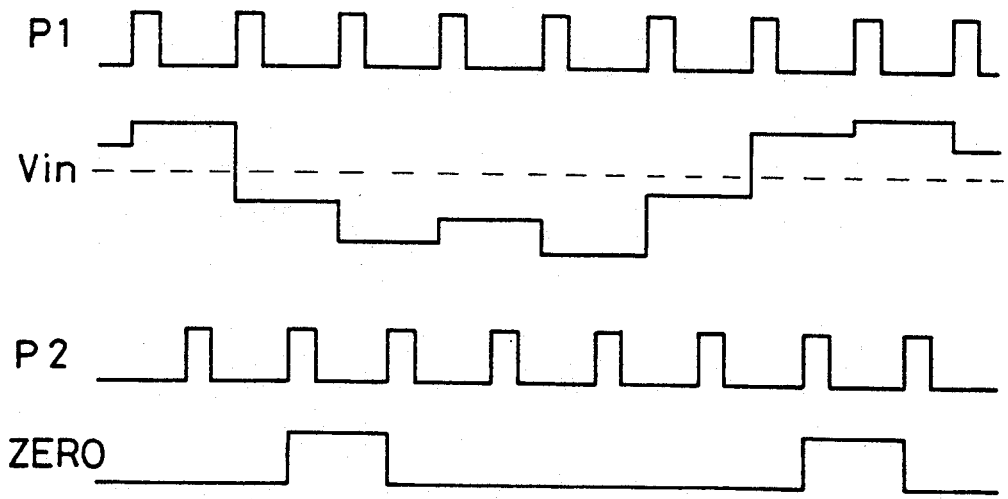
FIG. 6 is a time chart for the circuit of FIG. 5.

As will be apparent from FIG. 1, secondary difference computing circuits 12, 22, 32 are connected to output terminals of said line sensors 10b, 20b, 30b, respectively, and said secondary difference computing circuits 12, 22, 32 compute secondary differences of the luminance distribution signals on the scene which have been obtained by the respective line sensors 10b, 20b, 30b. Referring to FIG. 3, said second difference computing circuits 12, 22, 32 utilize sample holding circuits 12a, 12b, 12d, 12e to shift and sample successively output signals Vin from the respective pixels of the line sensors 10b, 20b, 30b, as illustrated in FIG. 3, and utilize an operational amplifier 12f and resistors of appropriate values to calculate $$Vout = (R2/(2 * R1)) * (Vin(n-1) - 2 * Vin(n-1) + Vin(n)) \quad (8)$$

in order to determine the secondary difference. A time chart for these secondary difference computing circuits 12, 22, 32 is illustrated by FIG. 4. Referring to FIG. 7, (a) represents a distribution waveform presented by the luminance on the scene to be photographed, (b) represents a primary difference waveform and (e) represents a secondary difference waveform thereof.

As illustrated in FIG. 1, output signals of said secondary difference computing circuits 12, 22, 32 are applied to zero-cross detecting circuits 13, 23, 33, respectively, which detect then zero-cross points of the respective secondary difference obtained by the second difference computing circuits 12, 22, 32. As will be seen in FIG. 5, the output signal Vin from the secondary difference computing circuit 12 (22, 32) is applied to an input terminal of a comparator 13a, a component of the zero-cross detecting circuit 13 (23, 33), and a reference terminal of said comparator 13a is grounded. There are provided on the output side of the comparator 13a D flip-flops 13b, 13c connected in series so that the output of said comparator 13a is directly applied to said D flip-flop 13b. Q output of this D flip-flop 13b is applied to the D flip-flop 13c and an AND circuit 13d while a $\overline{Q}$ output is applied to an AND circuit 13e. Output signals of these AND circuits 13d, 13e are applied to an OR circuit 13f. As indicated by the time chart of FIG. 6, the output signal Vin of the secondary difference computing circuit 12 is applied to the comparator 13a in synchronization with a clock pulse P1 and, if said output signal Vin crosses the zero level and its sign changes, a zero-cross signal in the form of ZERO pulse is output from the OR circuit 13f in synchronization with a clock pulse P2 from the flip-flops 13b, 13c.

Zero-cross behavior signal waveforms obtained by said zero-cross detecting circuits 13, 23, 33 are applied to zero-cross memory circuits 14, 24, 34 and stored therein, respectively. These zero-cross behaviors are then stored in addresses which are output from respective address computing circuits 15, 25, 35 according to the pixel locations in the respective line sensors 10b, 20b, 30b. More specifically, the counter signals (COUNTER 1) are applied from a first counter 50 to the address computing circuits 15, 25, 35 for successive increment and said zero-cross behavior signal waveforms are stored in the respective addresses corresponding to the respective pixels in accordance with the following equations;

$$ADDRESS = COUNTER\ 1 - S \quad (9)$$

for the central memory circuit 14, $$ADDRESS = COUNTER\ 1 - S \quad (10)$$

for the right side memory circuit 24, $$ADDRESS = COUNTER\ 1 \quad (11)$$

for the left side memory circuit 34. In the equations (9) and (10), S represents a constant.

Count signals (COUNTER 2) from a second counter 60 are applied to said address computing circuits 25, 35. Count up and reset of said second counter 60 and said first counter 50 are under control of output signal from the control circuit 40. The second counter 60 increments the address for every read-out of data from the zero-cross memory circuits 24, 34, as will be described later. The address computing circuits 15, 25, 35 are also supplied from the control circuit 40 with address processing information on the basis of which the address computing circuits 15, 25, 35 output predetermined write/read signals into and from the zero-cross memory circuits 14, 24, 34.

The count signal from the first counter 50 is applied to an address port 81 of a data memory circuit 80 while the count signal from the second counter 60 is applied to a range data port 82 of said data memory circuit 80. Both the count signals from the first counter 50 and the second counter 60 are also applied to the control circuit 40. The control circuit 40 supplies the data memory circuit 80 with a data memory signal on the basis of which the address data and the range data are stored in the data memory circuit 80.

Now referring to FIGS. 8 and 9, a routine to write and read the luminance information memory for a scene to be photographed will be described.

Upon start of range finding, charge accumulation occurs on the respective line sensors 10b, 20b, 30b (step 801), then the second counter 60 is reset (step 802) and the first counter 50 also is reset (step 803). Data corresponding to a single pixel in each line sensor 10b, 20b, 30b is read out (step 804), the data thus read out are written into the respective zero-cross memory circuits 14, 24, 34 (step 805). It should be understood here that zero-cross detection is executed between the step 804 and the step 805. Next, the routine proceeds to a step 806 to determine whether read-out concerning all the pixels has been completed or not, based on a value of the first counter 50. If not, the routine now proceeds to a step 807 to count up the first counter 50 and then returns to the step 804 to read respective single pixels, followed by writing them into the zero-cross memory circuits 14, 24; 34 (step 805). The data written into the zero-cross memory circuits 14, 24, 34 are stored in the addresses assigned by the address computing circuits 15, 25, 35, based on the count signals from the first counter 50. The addresses in which the data are to be stored are assigned according to the above-mentioned equations (9), (10), (11). It should be understood that, when the addresses are negative, no write-in occurs.

If read-out of the data corresponding to all the pixels has been completed and conclusion of said step 806 is YES, the routine then proceeds to a step 901 (FIG. 9) to reset the first counter 50. Next, data are read out from the zero-cross memory circuits 14, 24, 34 (step 902) and the coincidence detecting circuit 70 determines whether the data from the central zero-cross memory circuit 14, the right side zero-cross memory circuit 24 and the left side zero-cross memory circuit 34 coincide or not (step 903). If a coincidence is detected, the routine proceeds to a step 904 to write a current value of the first counter's count signal (COUNTER 1) as address data and a current value of the second counter's count signal (COUNTER 2) as range data into the data memory circuit 80. If determination of the step 903 is NO, the routine proceeds to a step 905 to determine whether the memory data (reference data) corresponding to all the effective pixels in the central line sensor 10b have been completely read out or not, based on the count value of the first counter 50. If not, the routine proceeds to a step 906 to count up the first counter 50 and thereafter returns to the step 902 to repeat the steps 902 through 905.

After read-out of the reference data has been completed, the routine proceeds from the step 905 to a step 907 to determine whether the data in the right and left side zero-cross memory circuit 24, 34 have been shifted by a specified amount and the above-mentioned steps 901 through 905 have been executed (shift read-out) or not, based on the count value of the second counter 60 (step 907).

If the shift read-out has not been completed, the second counter 60 is counted up and thereafter the routine returns to the step 901. Then, the steps 902 through 905 are repeated. After the shift read-out has been completed, the routine proceeds to step 909.

Read-out of the memory data during these steps 901 through 908 with the help of the address computing circuits 15, 25, 35 which designate the respective addresses according to the following equations corresponding to the previously mentioned equations (9), (10), (11), respectively:

$$\text{ADDRESS} = \text{COUNTER 1} \quad (12)$$

for the central zero-cross memory circuit 14, $$\text{ADDRESS} = \text{COUNTER 1} + \text{COUNTER 2} \quad (13)$$

for the right side zero-cross memory circuit 24, and $$\text{ADDRESS} = \text{COUNTER 1} + S - \text{COUNTER 2} \quad (14)$$

for the left side zero-cross memory circuit 34. In the equation (14), S represent a constant. A relationship established here between write-in address and read-out address will be explained in reference with FIGS. 10 and 11.

FIG. 10(a) illustrates the case in which the count signal from the second counter 60 is set to 0 (COUNTER 2=0). In such case, the data stored in the addresses corresponding to the respective pixels in the line sensors 10b, 20b, 30b are successively compared one to another with the first counter 56 being successively incremented from 0 to (W−1) and thereby a coincidence of these data is detected. Accordingly, if COUNTER 2=0, the address will be incremented from 0 to (W−1) for the pixels in the central line sensor 10b as well as the right side line sensor 20b and from S to (S+W−1) for the pixels in the left side line sensor 30b. Then, the second counter 60 is incremented (step 908) and, as indicated by FIG. 10(b), the data stored in the address corresponding to the respective pixels in the line sensor 10b, 20b, 30b are compared to one another with the first counter 50 being successively incremented from 0 to (W−1) with the count signal of the second counter 60 being set to (COUNTER 2=1) and thereby a coincidence of the data is detected. Accordingly, when COUNTER 2=1, the address will be incremented from 0 to (W−1) for the central line sensor 10b, from 1 to W for the right side line sensor 20b and from (S−1) to (S+W−2) for the left side line sensor 30b. In other words, the memory data in the right side zero-cross memory circuit 24 and the left side zero-cross memory circuit 34 will be subjected to the coincidence detection with a shift of one pixel relative to the memory data in the central zero-cross memory circuit 14.

The coincidence detection will be repeated until the second counter 60 is incremented up to COUNTER 2=S (step 908). FIG. 11(a) illustrates the case of COUNTER 2=S−1 and FIG. 11(b) illustrates the case of COUNTER 2=S.

More specifically, the count value of the second counter 60 at the moment when the memory data in the respective zero-cross memory circuits 14, 24, 34 come in coincidence with one another corresponds to the amount of displacement Xp in the previously mentioned equation (6). At the step 904, this amount of displacement is stored in the data memory circuit 80 as the range data.

If said step 907 determines that read-out of the given shift has been completed, the routine proceeds to a step 909 at which the range data written into the data memory circuit 80 at the step 904 is applied to an objective driver mechanism (not shown) so that the objective may be moved so as to focus the camera on the scene.

EMBODIMENT 1.2

Referring to FIGS. 12 and 13, this Embodiment 1.2 is characterized by a variation in the zero-cross detecting circuit 13 (23, 33) of the Embodiment 1.1.

As will be understood from FIG. 12, the output signal Vin from the secondary difference computing circuit 12 (22, 32) is applied to input terminal of comparator 1321 of this zero-cross detecting circuit 13 (23, 33) and a reference terminal of said comparator 1321 is grounded. The zero-cross detecting circuit 12 (22, 32) includes, on the output side of the comparator 1321, D flip-flops 1322, 1323 and AND circuit 1324, 1325. The output of said comparator 1321 is applied to the D flip-flop 1322. Q output of this D flip-flop 1322 is applied to the D flip-flop 1323 and the AND circuit 1324 while $\overline{Q}$ output is applied to the AND circuit 1325. Q output of said D flip-flop 1323 is applied to said AND circuit 1325 and $\overline{Q}$ output is applied to said AND circuit 1324. As indicated by a time chart of FIG. 13, the output signal Vin from the secondary difference computing circuit 12 is applied to the comparator 1321 in synchronization with the pulse Pl and, as illustrated by z in FIG. 13, there is generated a signal having a waveform which rises or falls every time said output signal Vin crosses the zero level (Vz) and changes it sign. As this signal z is applied to the flip-flop 1322, 1323, the AND circuit 1324 outputs, in synchronization with the clock pulse P2, a zero-cross signal in the form of a rising up pulse (P-ZERO) if the signal z is in the rising condition and the AND circuit 1325 outputs a zero-cross signal in the form of a rising up pulse (N-ZERO) if the signal z is in the falling down condition.

Specifically, the condition in which the pulse P-ZERO is rising up corresponds to the condition in which the secondary difference Vin changes from positive to negative and thereby crosses the zero level and the condition in which the pulse N-ZERO is rising up corresponds to the condition in which the secondary difference Vin changes from negative to positive and thereby crosses the zero level.

Thus, the zero-cross behavior signal waveforms provided from said zero-cross detecting circuit 13, 23, 33 are applied to said zero-cross memory circuits 14, 24, 34 and stored therein.

With this Embodiment 1.2, the zero-cross behavior of the secondary difference is detected during transitions from positive to negative and from negative to positive, respectively, so as to compare the coincidence relationships in both cases and in consequence, a relatively accurate range data can be obtained without a significant affection due to a pattern of the scene.

EMBODIMENT 1.3

Referring to FIGS. 14 and 15, there is illustrated the Embodiment 1.3 characterized also by a variation in the zero-cross detecting circuit 13 (23, 33).

As will be apparent from FIG. 14, the output signal Vin from the secondary difference computing circuit 12 (22, 32) is applied to the zero-cross detecting circuit 13 (23, 33) via comparators 1331, 1332. Voltage Vp is applied to a reference terminal of the comparator 1331 while voltage Vn is applied to a reference terminal of the comparator 1332. Said voltage Vp is set, as a level voltage, to a value higher than zero level and the voltage Vn is set, also as a level voltage, to a value lower than zero level. As a result, it will be understood from FIG. 15 that the comparator 1331 is responsive to the signal Vin applied thereto to output a pulse p which remains H so long as said signal Vin is higher than said level voltage Vp while the comparator 1332 is responsive to said signal Vin to output a pulse n which remains H as long as said signal Vin is lower than said level voltage Vn.

The zero-cross detecting circuit 13 is responsive to said pulses p, n applied thereto to output in synchronization with the clock pulses P2, as the zero-cross signals, a pulse N-ZERO when the signal p is H and a pulse P-ZERO when the signal n is H. The output signals of the zero-cross detecting circuit 13 are so controlled that the N-ZERO can rise only when the P-ZERO has risen immediately before and the P-ZERO can rise only when the N-ZERO has risen immediately before, i.e., that the same signal can not successively rise. Thus, the zero-cross signal P-ZERO rises as the secondary difference Vin which has been higher than the level voltage Vp changes to a value lower than the level voltage Vn and the zero-cross signal N-ZERO rises as the secondary difference Vin which has been lower than the level voltage Vn changes to a value higher than the level voltage Vp. Accordingly, the output signal Vin from the secondary difference computing circuit 12 is determined to have crossed the zero level when said signal Vin has changed beyond both the level voltage Vp and the level voltage Vn and is not determined to have crossed the zero level when said signal Vin has changed between said voltages Vp, Vn, even if said signal Vin has actually crossed the zero level.

In other words, rising of the pulse P-ZERO corresponds to an event that the secondary difference Vin changes from positive to negative and thereby a zero-cross occurs while rising of the pulse N-ZERO corresponds to an event that the secondary difference Vin change from negative to positive and thereby a zero-cross occurs.

The zero-cross behavior signal waveforms obtained by said zero-cross detecting circuits 13, 23, 33 are applied to said zero-cross memory circuits 14, 24, 34 and stored therein, respectively.

EMBODIMENT 1.4

Referring to FIGS. 16 and 17, there is illustrated the Embodiment 1.4 including the zero-cross detecting circuit corresponding to a variant of the zero-cross detecting circuit 13 (23, 33) in the Embodiment 1.1.

AS will be apparent from FIG. 16, the output signal Vin of the secondary difference computing circuit 12 (22, 32) is a applied to the zero-cross detecting circuit 13, (23, 33) via comparators 1341, 1342, 1343 while voltage Vp is applied to a reference terminal of the comparator 1341, voltage Vz is applied to a reference terminal of the comparator 1342 and voltage Vn is applied to a reference terminal of the comparator 1343. The voltage Vp is sat to a value higher than the zero level, the voltage Vn is set to a value lower than the zero level and the voltage Vz is set to a value of the zero level. These voltages are set as level voltages. With a consequence, the comparator 1341 outputs a pulse p which is H as long as said signal Vin indicates a value higher than the level voltage Vp, the comparator 1342 outputs a pulse z which is H as long as said signal Vin indicates a value lower than the level voltage Vz and the comparator 1343 outputs a pulse n which is H as long as said signal Vin indicates a value lower than the level voltage Vn. The zero-cross detecting circuit 13 is responsive to said pulses p, z, n applied thereto to output, in synchronization with the clock pulses P2, zero-cross signals in the form of a pulse N-ZERO which rises as the signal z falls when the signal n is L and pulse P-ZERO which rises as the signal z rises when the signal p is L. The output signals of the zero-cross detecting circuit 13 are so controlled that N-ZERO can rise only when the P-ZERO has risen immediately before and the P-ZERO can rise only when the N-ZERO has risen immediately before, i.e., that the same signal can not successively rise. Thus the zero-cross signal P-ZERO rises as the secondary difference Vin which has been higher than the level voltage Vp changes to a value lower than the level voltage Vz and the zero-cross signal N-ZERO rises as the secondary difference Vin which has been lower than the level voltage Vn changes to a value higher than the level voltage Vz. Accordingly, the output signal Vin from the secondary difference computing circuit 12 is determined to have crossed the zero level when said signal Vin has changed beyond both the level voltages Vp and Vz, in one case, and beyond both the level voltages Vn and Vz, in the other case, but not determined to have crossed the zero level when said signal Vin has changed between said voltages Vp, Vn, even if said signal Vin has actually crossed the zero level (Vz).

In other words, rising of the pulse P-ZERO corresponds to an event that the secondary difference Vin changes from positive to negative and thereby a zero-cross occurs while rising of the pulse N-ZERO corresponds to an event that the secondary difference Vin changes from negative to positive and thereby a zero-cross occurs.

The zero-cross behavior signal waveforms obtained by said zero-cross detecting circuits 13, 23, 33 are applied to said zero-cross memory circuits 14, 24, 34 and stored therein, respectively.

According to said Embodiment 1.3 or the instant Embodiment 1.4, the secondary difference output signal is divided by two or more determination levels above and below the zero level into three or more level zones so that an occurrence of the zero-cross is determined when said output signal has changed over a wide extent including the level zones which are not adjacent to each other but not when said output signal has slightly changed above and below the zero level. Accordingly, a small variation in the luminance distribution on the scene provides no range data and thus an erroneous range finding is minimized.

These Embodiments allow further accurate range data to be obtained without any significant affection of the scene's particular pattern because of the unique arrangement that the zero-cross behavior of the secondary difference is detected with respect to both the positive-to-negative change and the negative-to-positive change in order to compare the manners of coincidence in these two cases.

EMBODIMENT 1.5

Referring to FIGS. 18 and 19, there is illustrated the Embodiment 1.5 which includes the zero-cross detecting circuit corresponding to a variant of the zero-cross detecting circuit 13 (23, 33) in the Embodiment 1.1.

As will be apparent from FIG. 18, the output signal Vin of secondary difference computing circuit 12 (22, 32) is applied to the zero-cross detecting circuit 13 (23, 33) via a comparator 1351 while the zero level voltage Vz is applied to + terminal of this comparator 1351. Consequently, the output signal z of the comparator 1351 presents a waveform which is H when the output signal is lower than the zero level voltage Vz as best seen in FIG. 19. The output signal z of the comparator 1351 is applied to a 3-bit shift register comprising D flip-flops 1352, 1353, 1354. Q terminal of the flip-flop 1352, $\bar{Q}$ terminal of the flip-flop 1353 and $\bar{Q}$ terminal of the flip-flop 1354 are tied to an AND circuit 1355 while $\bar{Q}$ terminal of the flip-flop 1352, Q terminal of the flip-flop 1353 and Q terminal of the flip-flop 1354 are tied to an AND circuit 1356.

Referring to FIG. 19, if the signals z which were output in synchronization with preceding two clock signals P2 and then stored were in the sate of H and are now in the state of L for the current clock pulse P2, the AND circuit 1356 outputs a zero-cross signal in the form of the signal N-ZERO which rises in synchronization with this current clock pulse P2. On the contrary, if the signals z have been in the state of L for the period of said preceding two clock pulse P2, the AND circuit 1355 outputs a zero-cross signal in the form of the signal P-ZERO which rises in synchronization with said current clock pulse P2. More specifically, the zero-cross signal is output when the state of the secondary difference Vin has continued for a predetermined period corresponding to a predetermined number of pixels before said secondary difference Vin changes relative to the zero level voltage Vz. Accordingly, the zero-cross for too short period is not detected. Rising of N-ZERO corresponds to an event that the secondary difference Vin changes from negative to positive and thereby a zero-cross occurs while rising of P-ZERO corresponds to an event that the secondary difference Vin changes from positive to negative and thereby a zero-cross occurs.

The zero-cross behavior signal waveforms obtained by said zero-cross detecting circuits 13, 23, 33 are applied to said zero-cross memory circuits 14, 24, 34 and stored therein, respectively.

EMBODIMENT 1.6

Referring to FIGS. 20 and 21, there is illustrated the Embodiment 1.6 which is characterized by the zero-cross detecting circuit corresponding to a variant of the zero-cross detecting circuit 13 (23, 33) in the Embodiment 1.1.

As will be seen in FIG. 20, the output signal Vin of the secondary difference computing circuit 12 (22, 32) is applied to a comparator 1361 and the zero level voltage Vz is applied to + terminal of said comparator 1361. In consequence, an output of said comparator 1361 presents a waveform as illustrated by FIG. 21, which becomes H when the output signal Vin is lower than the zero level voltage Vz. The output signal z of this comparator 1361 is applied to a 4-bit shift register comprising D flip-flops 1362, 1363, 1364, 1365. Q terminals of the flip-flops 1362, 1363 and $\bar{Q}$ terminals of the flip-flops 1364, 1365 are tied to an AND circuit 1366 while $\bar{Q}$ terminals of the flip-flops 1362, 1363 and Q terminals of the flip-flops 1364, 1365 are tied to an AND circuit 1367.

Referring to FIG. 21, if the signals z which were output in synchronization with preceding the clock signals P2 and then stored were in the state of H for first and second clock pulses of said three clock pulses, then began to fall for the following one clock pulse and now in the state of L for the current clock pulse, the AND circuit 1367 output a zero-cross signal in the form of the signal N-ZERO which rises for said current clock pulse. On the contrary, if the signals z were in the state of L for first and second clock pulses of said three clock pulses, then began to rise for the following one clock pulse and now in the state of H for the current clock pulse, the AND circuit 1366 output a zero-cross signal in the form of the signal P-ZERO which rises in synchronization with said current clock pulse P2. More specifically, the zero-cross signal is output when the state of the secondary difference Vin has continued for a predetermined period corresponding to a predetermined number of pixels before said secondary difference Vin changes relative to the zero level voltage Vz. Accordingly, the zero-cross for too short period is not detected. Rising of N-ZERO corresponds to an event that the secondary difference Vin changes from negative to positive and thereby a zero-cross occurs while rising of P-ZERO corresponds to an event that the secondary difference Vin changes from positive to negative and thereby a zero-cross occurs.

The zero-cross behavior signal waveforms obtained by said zero-cross detecting circuits 13, 23, 33 are applied to said zero-cross memory circuits 14, 24, 34 and stored therein, respectively.

According to the previous Embodiment 1.5 or the instant Embodiment 1.6, it is determined whether the secondary difference signal is on the positive side or on the negative side across the zero level and occurrence of a zero-cross is concluded only when any one state of said secondary difference signal has continued for a predetermined period and changes to the other state. Accordingly, even if the signal Vin behaves across the zero level for too short period, such behavior is not concluded as occurrence of a zero-cross. Consequently, range finding operation is not affected by a variation in the scene luminance due to an instantaneous change in weather or an instantaneous reorientation of the scene surface and a slight change in the scene luminance distribution provides no rang data, thus minimizing an erroneous range finding operation.

These Embodiments allow further accurate range data to be obtained without any significant affection of the scene's particular pattern because of the unique arrangement such that the zero-cross behavior of the secondary difference is detected with respect to both the positive-to-negative change and the negative-to-positive change in order to compare the manners of coincidence occurring in these two cases.

EMBODIMENT 1.7

FIG. 22 illustrates the Embodiment 1.7 similar to said Embodiment 1.3 except that the zero-cross signal is processed in a manner different from the manner employed by the zero-cross detecting circuit 13 (23, 33) in said Embodiment 1.3. The zero-cross detecting circuit 13 (23, 33) itself is identical to that shown by FIG. 14.

In the Embodiment 1.7, it will be understood from FIG. 22 that the comparator 1331 is responsive to the signal Vin applied thereto to output a pulse p which is in the state of H as long as said signal Vin is higher than the level voltage Vp and the comparator is responsive to the signal Vin applied thereto to output a pulse n which is in the state of H as long as said signal Vin is lower than the level voltage Vn.

Said pulse p, n are applied to the zero-cross detecting circuit 13 and the states thereof are stored in synchronization with the clock pulses P2. If the pulse n was in the state of H for any one of three clock pulses P2 preceding the clock pulse P2 at which the pulse p rises, the zero-cross detecting circuit 13 outputs a zero-cross signal in the form of the signal N-ZERO which rises in synchronization with said clock pulse P2 at which the pulse p is in the state of H. If the pulse p was in the state of H for any one of three clock pulses P2 preceding the clock pulse P2 at which the pulse n rises, the zero-cross detecting circuit 13 outputs a zero-cross signal in the form of the signal P-ZERO which rises in synchronization with said clock pulse P2 at which the pulse n is in the state of H. As will be understood from the relationship as mentioned above, the zero-cross signal P-ZERO corresponds to an event that the secondary difference Vin has changed from a value higher than the level voltage Vp down to a value lower than the level voltage Vn and will rise if such change has occurred within predetermined period, i.e., within a predetermined number of pixels while the zero-cross signal N-ZERO corresponds to an event that the secondary difference Vin has changed from a value lower than the level voltage Vn up to a value higher than the level voltage Vp and will rise if such change has occurred within a predetermined period, i.e., within a predetermined number of pixels. Accordingly, even if zero-cross behavior of the output signal Vin occurred between the level voltage Vp and Vn, such behavior is not regarded as occurrence of a zero-cross.

Rising of the pulse P-ZERO corresponds to an event that the secondary difference Vin changes from positive to negative and thereby a zero-cross occurs with rising of the pulse N-ZERO corresponds to an event that the secondary difference Vin changes from negative to positive and thereby a zero-cross occurs.

The zero-cross behavior signal waveforms obtained by said zero-cross detecting circuits 13, 23, 33 are applied to said zero-cross memory circuits 14, 24, 34 and stored therein, respectively.

EMBODIMENT 1.8

Referring to FIG. 23, the Embodiment 1.8 is similar to said Embodiment 1.4 except that the zero-cross signal is processed in a manner different from the manner employed by the zero-cross detecting circuit 13 (23, 33) in said Embodiment 1.4. The zero-cross detecting circuit 13 (23, 33) itself is identical to that shown by FIG. 16.

In this Embodiment 1.8, it will be understood from FIG. 23 that the comparator 1341 is responsive to the signal Vin applied thereto to output a pulse p which is in the state of H as long as said signal Vin is higher than the level voltage Vp, the comparator 1342 is responsive to the signal Vin applied thereto to output a pulse z which is in the state of H as long as said signal Vin is lower than the level voltage Vz and the comparator 1343 is responsive to the signal Vin applied thereto to output a pulse n which is in the state of H as long as said signal Vin lower than the level voltage Vn.

Said pulse p, z, n are applied to the zero-cross detecting circuit 13 and the states thereof are stored in synchronization with the clock pulses P2. If the pulse z is in the state of L and the pulse n was in the state of H for at least two of three clock pulses P2 preceding the clock pulse P2 corresponding to said pulse z, the zero-cross detecting circuit 13 outputs a zero-cross signal in the form of the rising signal N-ZERO. On the contrary, if the pulse z is in the state of H and the pulse p was in the state of H for at least two of three clock pulse P2 preceding the clock pulse P2 corresponding to said pulse z, the zero-cross detecting circuit 13 outputs a zero-cross signal in the form of the rising P-ZERO. As will be understood from such relationship, the zero-cross signal P-ZERO corresponds to an event that the secondary difference Vin changes from a value higher than the level voltage Vp down to a value lower than the level voltage Vz and will rise if such change has occurred with a predetermined period, i.e., within a predetermined number of pixels while the zero-cross signal N-ZERO corresponds to an even that the secondary difference Vin has changed from a value lower than the level voltage Vn up to a value higher than the level voltage Vz and will rise if such change has occurred within a predetermined period, i.e., within a predetermined number of pixels. Accordingly, even if a zero-cross behavior of output signal Vin occurs between the level voltages Vp and Vn, or even if the output signal Vin which had behaved between the level voltages Vp and Vn for a period longer than the predetermined number of pixels goes up beyond the level voltage Vp or goes down beyond the level voltage Vn to cross the zero level, this not regarded as a zero-cross.

Rising of the pulse P-ZERO corresponds to an event that the secondary difference Vin changes from positive to negative and thereby a zero-cross occurs while rising of the pulse N-ZERO corresponds to an event that the secondary difference Vin changes from negative to positive and thereby a zero-cross occurs.

The zero-cross behavior signal waveforms obtained by the zero-cross detecting circuits 13, 23, 33 are applied to said zero-cross memory circuits 14, 24, 34 and stored therein, respectively.

According to said Embodiment 1.7 and the instant Embodiment 1.8, the secondary difference output signal is divided by two or more determination levels around the zero level into three or more level zones and a zero-cross is concluded when the output signal changes over the level zones which are not adjacent to one another for a period corresponding to a predetermined number of pixels in the photosensors but not concluded when said output signal changes over a smaller extent around the zero level. Accordingly, a slight change in the scene luminance distribution provides no range data, thus minimizing an erroneous operation of range finding.

Additionally, these Embodiments allow further accurate range data to be obtained without any significant affection of the scene's particular pattern because of the unique arrangement such that the zero-cross behavior of the secondary difference is detected with respect to both the positive-to-negative change and the negative-to-positive change in order to compare the manners of coincidence occurring in these two cases.

EMBODIMENT 2

This Embodiment 2 shown by FIGS. 24 through 28 differs from the previous Embodiment 1.1 through 1.7 in the arrangement serving to pick up a luminance distribution on the scene. In view of this, the parts of this Embodiment corresponding to those of the Embodiment 1.1 are designated by the reference numerals used for the Embodiment 1.1.

Figure 25:
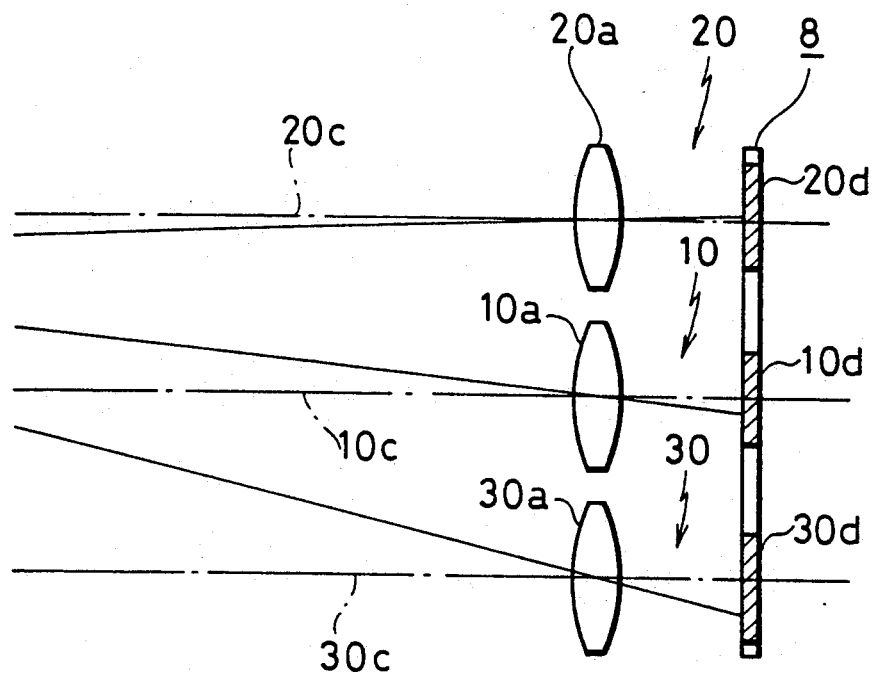
FIG. 25 is a side view schematically showing the photosensors used in the block diagram of FIG. 24.

The photosensors 10, 20, 30 comprise a line sensor which comprises, in turn, a photodetector array including an appropriate number of pixels arranged side by side, and three imaging lenses combined with said line sensor. Referring to FIG. 25, there are provided on the front side of the photographic camera three imaging lenses 10a, 20a, 30a so that light rays emitted from a scene to be photographed pass through these imaging lenses 10a, 20a, 30a and imaged on corresponding zones of the line sensor 8 placed behind said imaging lenses. The line sensor 8 is accordingly divided into three sections, i.e., the central section 10d, the right side section 20d and the left side section 30d. Said photosensors 10, 20, 30 are designated here as the central sensor 110, the right side sensor 20 and the left side sensor 30 with optical axes 20c, 30c of the right side sensor 20 and the left side sensor 30, respectively, being arranged symmetrically with respect to an optical axis 10c of the central sensor 10.

Figure 24:
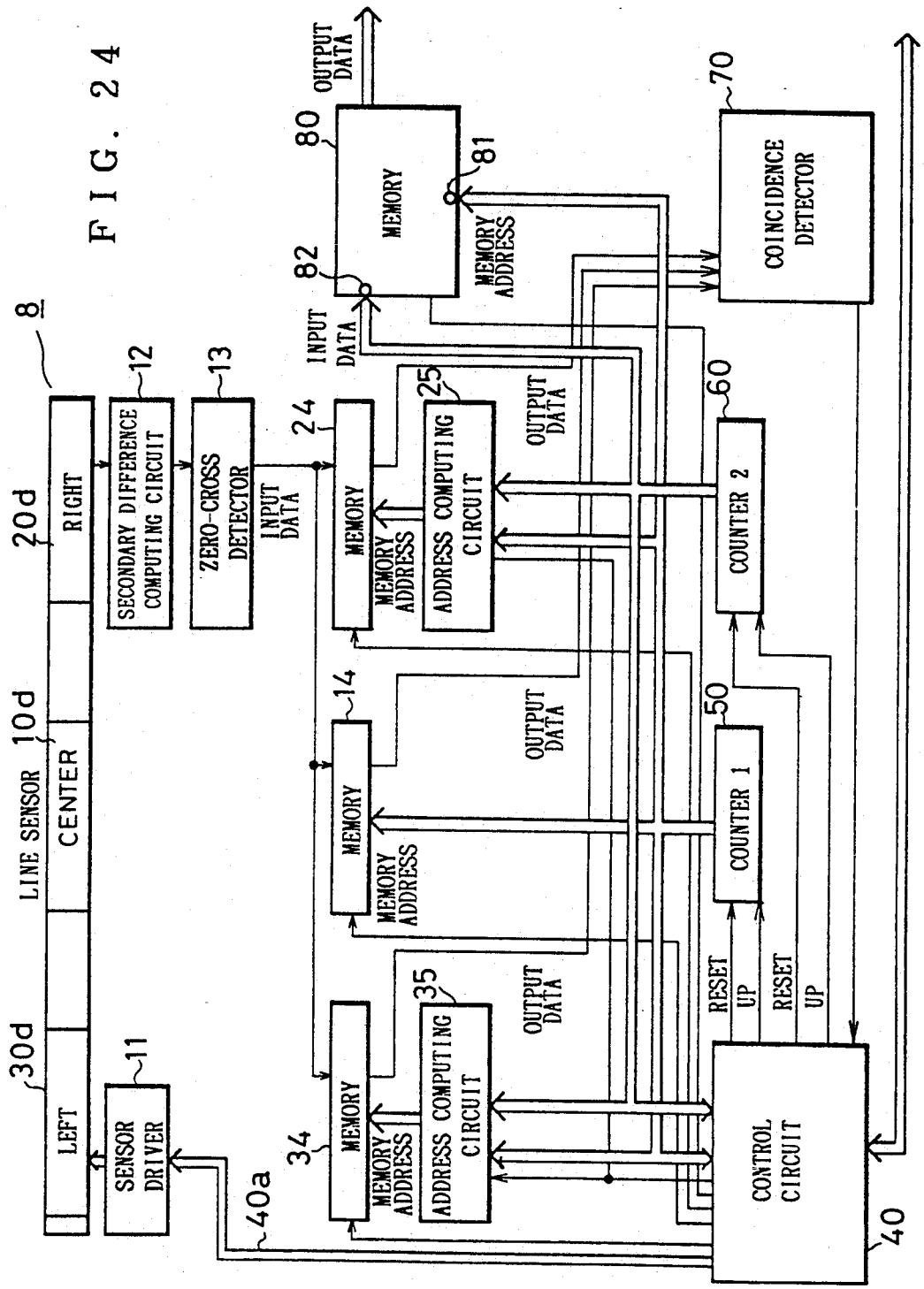
FIG. 24 is a block diagram showing Embodiment 2 of the range finder for passive type autofocussing device constructed in accordance with the invention.

Said line sensor 8 is applied, as illustrated in FIG. 24, with a drive signal from the sensor driver 11 and begins to pick up the light rays coming from the scene based on said drive signal. The sensor driver 11 is connected to the control circuit 40 via the drive control signal link 40a and controlled by a drive control signal provided from said control circuit 40.

As will be apparent from FIG. 24, the secondary difference computing circuit 12 is connected to the output terminal of said line sensor 8 and said secondary difference computing circuit 12 computes the secondary difference of the luminance distribution signals which have been obtained by the line sensor 8. The secondary difference computing circuit 12 is identical to that illustrated by FIGS. 3 and 4 and adapted to compute the secondary difference according to the previously mentioned equation (8).

The output signal of said secondary difference computing circuit 12 is applied, as shown in FIG. 24, to the zero-cross detecting circuit 13 which detects then the zero-cross point of the secondary difference obtained by the secondary difference computing circuit 12. This zero-cross detecting circuit 13 is identical to that used in Embodiment 1.1 described in reference with FIG. 5.

Zero-cross behavior signal waveform obtained by said zero-cross detecting circuit 13 is divided into three portions corresponding to the central section 10d, the right side section 20d and the left side section 30d of the line sensor 8, respectively, then separately applied to the zero-cross memory circuits 14, 24, 34, respectively, and stored therein. These zero-cross behaviors are then stored in addresses which are output from respective address computing circuits 25, 35 according to the pixel locations in the right side section 20d and the left side section 30d of the line sensor 8, respectively, and, for the central section 10d of the line sensor 8, stored according to the count signals (COUNTER 1) of the first counter 50. More specifically, the counter signals (COUNTER 1) are applied from the first counter 50 to the address computing circuits 25, 35 and the central memory circuit 14 for successive increment and said zero-cross behavior signal waveforms are stored in the respective addresses corresponding to the respective pixels in accordance with the following equations:

$$\text{ADDRESS} = \text{COUNTER 1} \qquad (15)$$

for the central memory circuit 14, $$\text{ADDRESS} = \text{COUNTER 1} \qquad (16)$$

for the right side memory circuit 24, and $$\text{ADDRESS} = \text{COUNTER 1} \qquad (17)$$

for the left side memory circuit 34.

Count signals (COUNTER 2) from the second counter 60 are applied to said address computing circuits 25, 35. Count up and reset of said second counter 60 and said first counter 50 are under control of output signal from the control circuit 40. The second counter 60 increments the address for every read-out of data from the zero-cross memory circuits 24, 34, as will be described later. The address computing circuit 25, 35 are also supplied from the control circuit 40 with address processing information on the basis of which the address computing circuits 25, 35 output predetermined write/read signals into and from the zero-cross memory circuit 24, 34.

Output of said zero-cross memory circuits 14, 24, 34 are together tied to the coincidence detecting circuit 70 of which the output is applied to the control circuit 40.

The count signal from the first counter 50 is applied to the address port 81 of the data memory circuit 80 while the count signal from the second counter 60 is applied to the range data port 82 of said data memory circuit 80. Both the count signals from the first counter 50 and the second counter 60 are also applied to the control circuit 40. The control circuit 40 supplies the data memory circuit 80 with a data memory signal on the basis of which the address data and the range data are stored in the data memory circuit 80.

Now referring to FIGS. 9, 26 and 28, a routine to write and read the luminance information memory for a scene to be photographed will be described.

Upon start of range finding, charge accumulation takes place on the line sensor 8 (step 2601), then the second counter 60 is reset (step 2602), and a read-out pixel number counter (not shown) provided within the control circuit 40 is reset (step 2603).

It is determined from a counter value of the read-out pixel number counter whether read of a first pixel in the left side section 30d of the single line sensor 8 started or not (step 2604) and the pixels are output one by one (step 2605) until data corresponding to said first pixel begins to be read-out. When said first pixel begins to be read-out, the first counter 50 is reset (step 2606). Data corresponding to one pixel in the left section 30d of the line sensor 8 is read-out (step 2607) and this read-out data is written into the left side zero-cross memory circuit 34 (step 2608). It should be understood that a zero-cross detection is executed between the steps 2607 and 2608. Next, the routine proceeds to a step 2609 to determine whether read-out concerning all the pixels has been completed or not, based on a value of the first counter 50. If not, the routine proceeds to a step 2610 to count up the first counter 50 and then returns to the step 2607 to read one pixel, following by writing it into the left side zero-cross memory circuit 34 (step 2608). The data written into the zero-cross memory circuit 34 is stored in the address assigned by the address computing circuit 35, based on the count signal from the first counter 50. The address in which the data is to be stored is assigned according to the above-mentioned equation (17).

If read-out of all the pixels in the left side section 30d of the line sensor 8 has been completed and thus conclusion of said step 2609 is YES, the routine proceeds to a step 2703 (FIG. 27) to detect read-out of the first pixel in the central section 10d of the line sensor based on a count value of the read-out pixel number counter and the pixels are output one by one (step 2704) until read-out of said first pixel starts. If read-out of said first pixel has started, the first counter 50 is reset (step 2705) and then the same steps as said step 2607 through 2610 are repeated. Namely, the pixels in the central section 10d of the line sensor are read-out one by one (step 2706) in parallel with the zero-cross detection, then written into the central zero-cross memory circuit 14 (step 2707) and it is determined whether all the pixels in the central section 10d of the line sensor have been completely read-out, based on the count value of the first counter 50 (step 2708) while said first counter 50 is counted up (step 2709). The address in which the data is to be stored is assigned according to said equation (15).

If all the pixels in the central section 10d of the line sensor have been read-out and conclusion of the step 2708 is YES, the routine proceeds to a step 2803 (FIG. 28) to detect read-out of the first pixel in the right side section 20d of the line sensor, based on the count value of the read-out pixel number counter while the pixels are output one by one (step 2804). If read-out of said first pixel has started, the first counter 50 is reset (step 2805). Then, the same routine as those for the left side section 30d and the central section 10d of the line sensor 6 are repeated for the right side section 20d of the line sensor 8. More specifically, the pixels in this right side section 20d are read-out one by one (step 2806) in parallel with the zero-cross detection, then written into the right side zero-cross memory circuit 24 (step 2807) and it is determined whether all the pixels in the right side section 20d of the line sensor have been completely read-out (step 2809) while the first counter 50 is counted up. The data written into the right side zero-cross memory circuit 24 is stored in the address assigned according to said equation (16), based on the count signal of the first counter 50.

Figure 9:
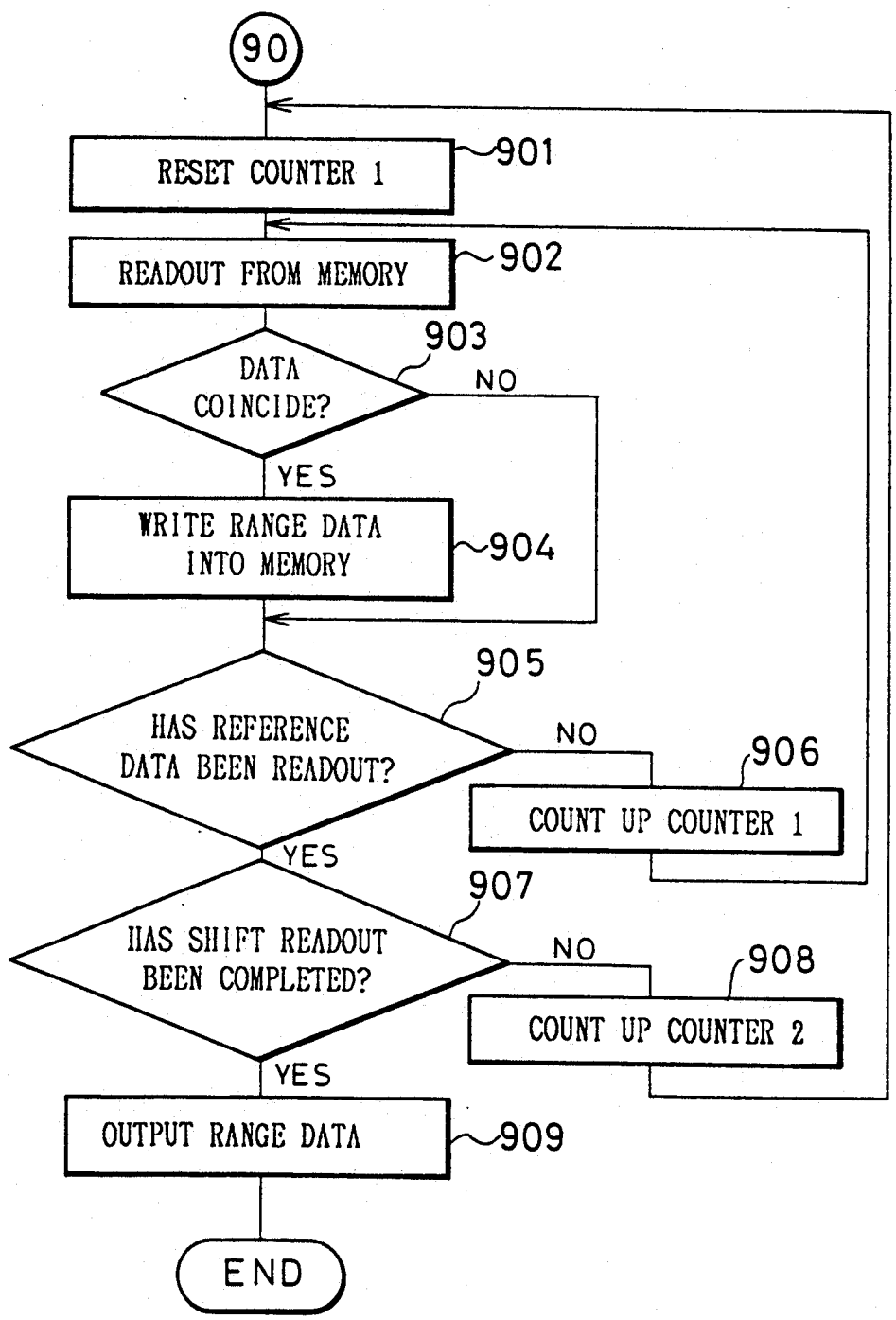
FIG. 9 is a flow chart of the routine executed in Embodiments 1.1 through 1.8 to read the given data from the zero-cross memory circuit.
Figure 10:
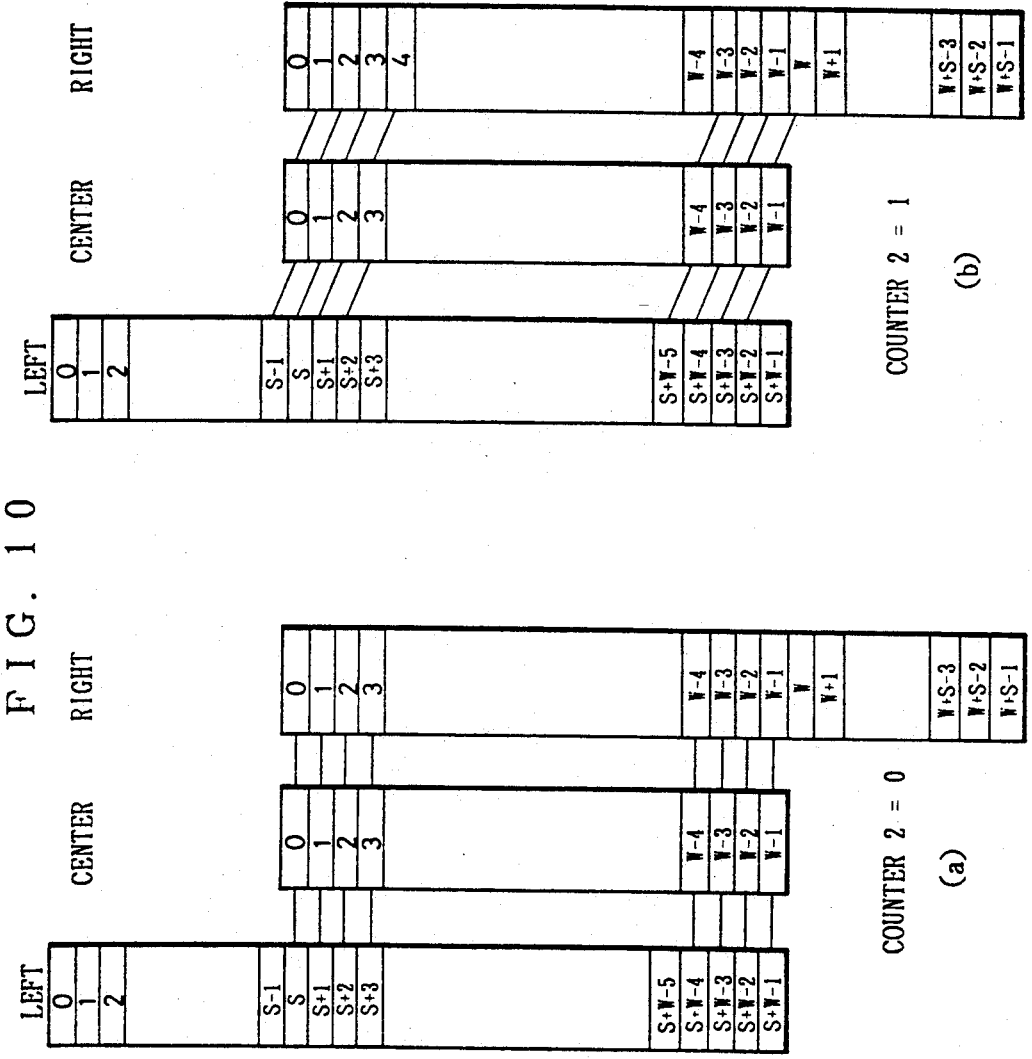
FIG. 10 is a diagram illustrating the procedure executed in Embodiments 1.1 through 1.8 and 2 to read and compare the data stored in the zero-cross memory circuits.
Figure 11:
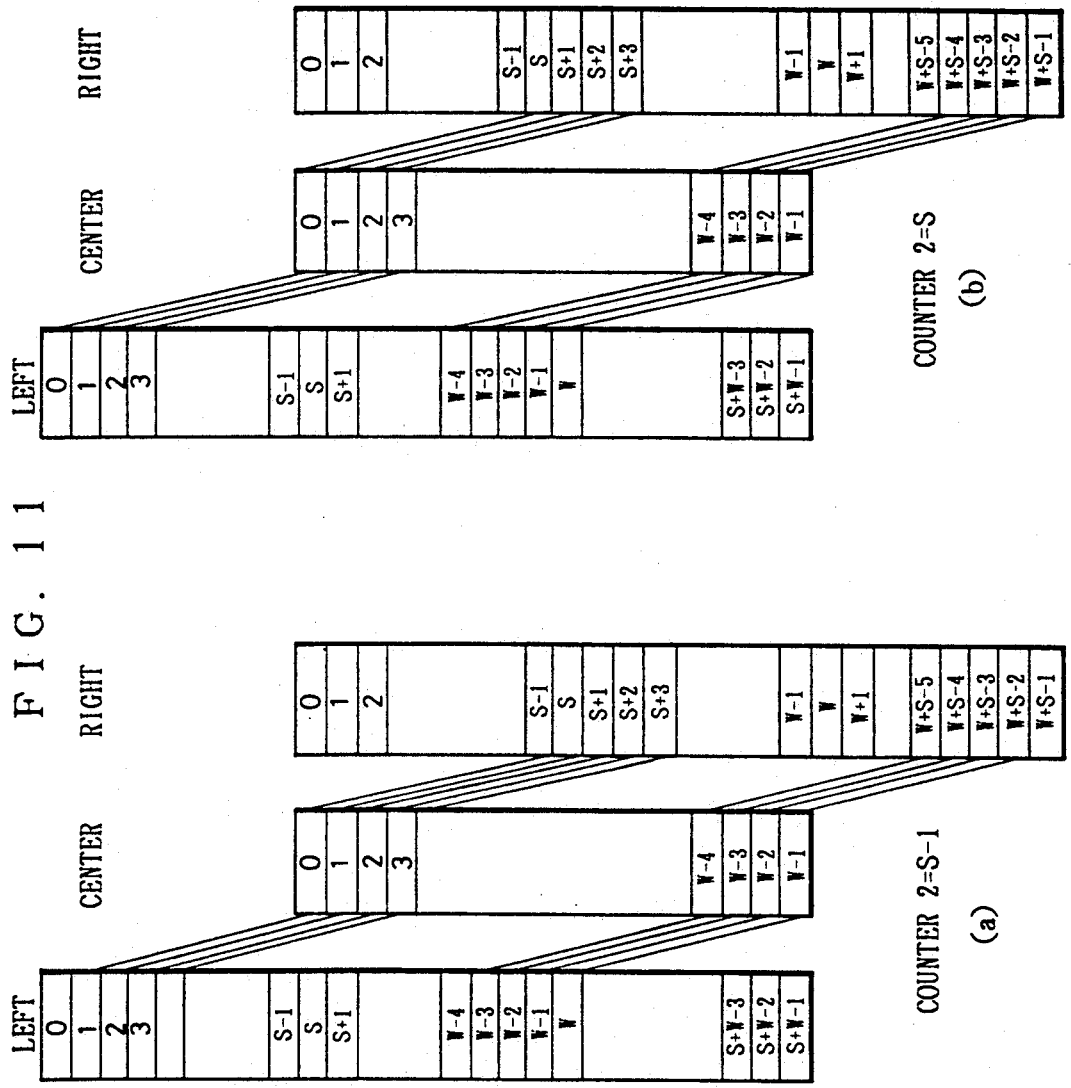
FIG. 11 is a diagram illustrating the procedure executed in Embodiments 1.1 through 1.8 and 2 to read and compare the data stored in the zero-cross memory circuits.

If read-out of all the pixels in the line sensor 8 has been completed and thus conclusion of the step 2808 is YES, the routine illustrated by FIG. 9 in connection with Embodiment 1.1 will be run.

In the instant Embodiment 1, a single secondary difference computing circuit and a single zero-cross detecting circuit may be utilized, since there is provided a single line sensor divided into three sections. Such arrangement advantageously reduces the number of parts with respect to the range finder employing three line sensors, each associated with three secondary difference computing circuits and three zero-cross detecting circuits.

It should be understood that it is also possible to provide this Embodiment 2 with the same zero-cross detecting circuits as those employed in the previous Embodiments 1.2 through 1.8.

EMBODIMENT 3

This Embodiment 3 shown by FIGS. 29 through 31 is distinguished from the previously described Embodiments 1.1 through 1.8 and 2 in the procedure for coincidence detection of the data stored in the zero-cross memory circuits 14, 24, 34.

Figure 8:
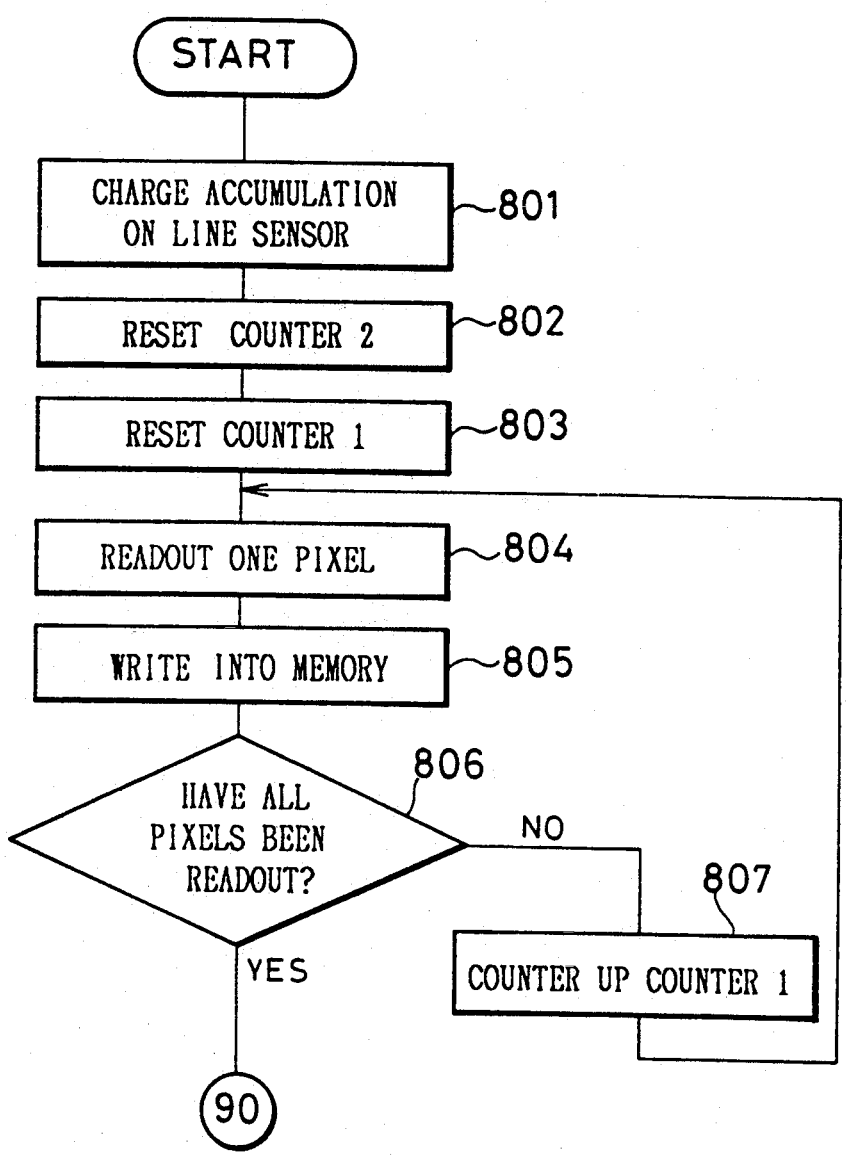
FIG. 8 is a flow chart of the routine executed in Embodiments 1.1 through 1.8 to write the data obtained from the line sensor into the zero-cross memory circuit.
Figure 26:
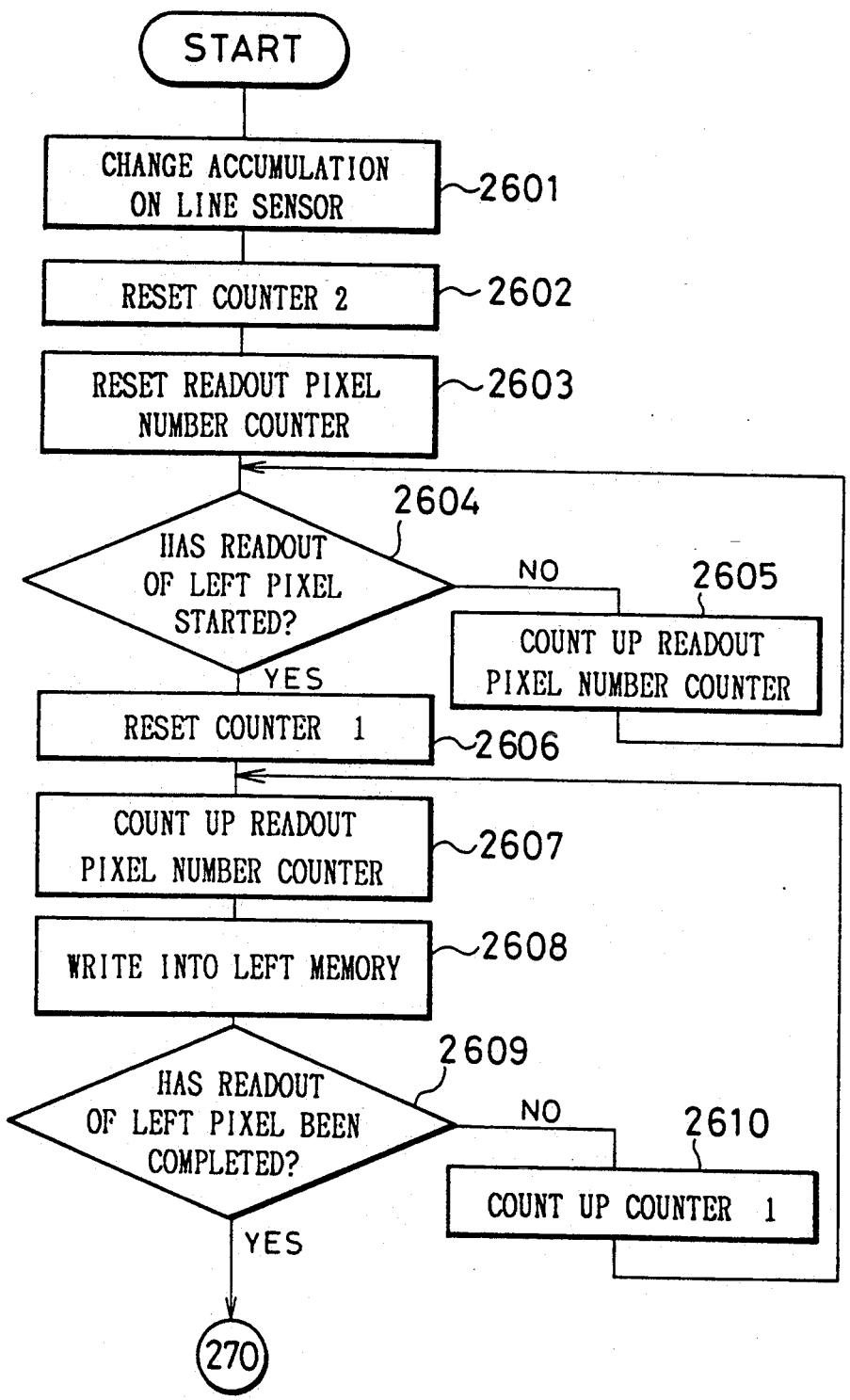
FIG. 26 is a flow chart of the routine to write the data obtained from the line sensor of FIG. 24, particularly from the left section thereof, into the zero-cross memory circuit.
Figure 27:
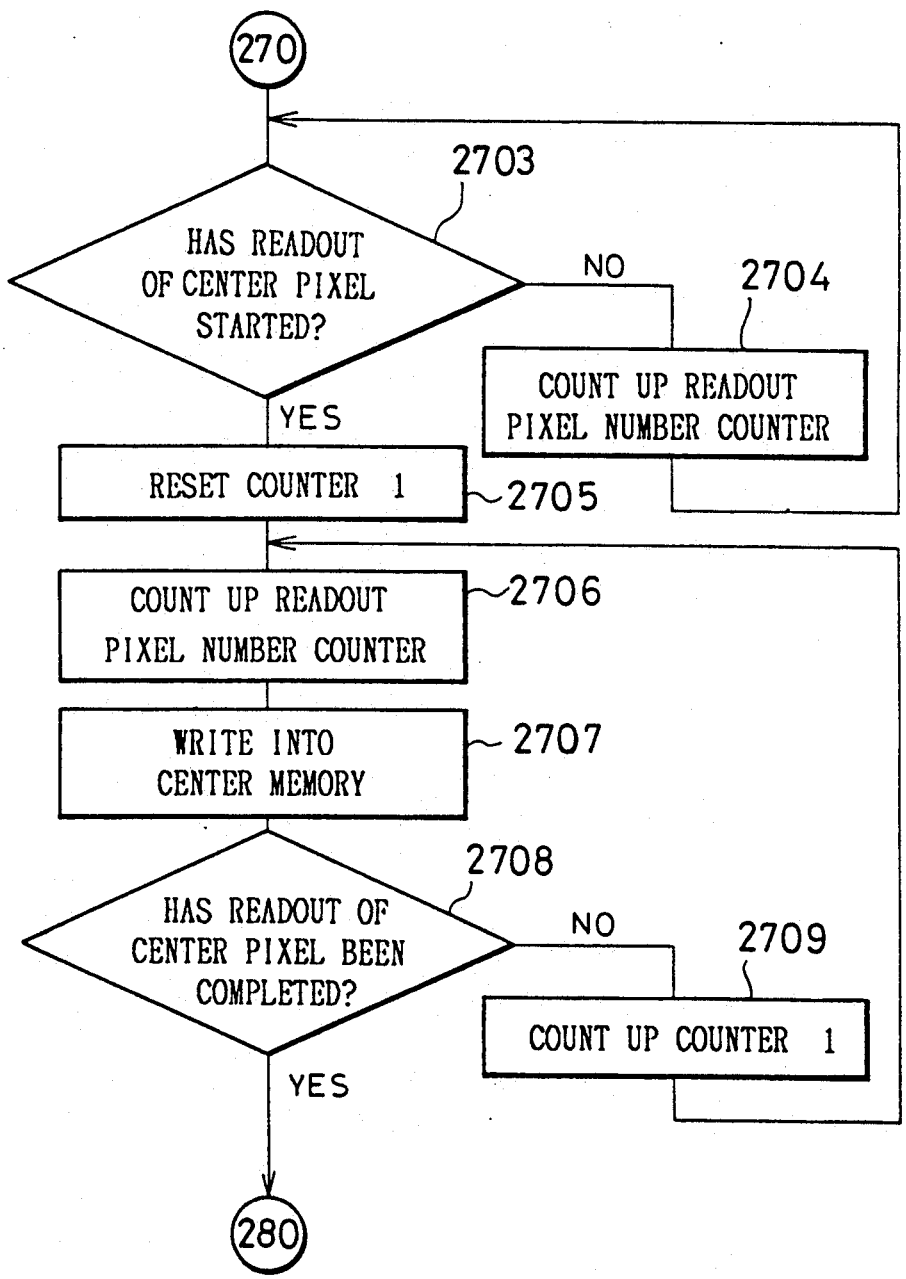
FIG. 27 is a flow chart of the routine to write the data obtained from the line sensor of FIG. 24, particularly from the central section thereof, into the zero-cross memory circuit.
Figure 28:
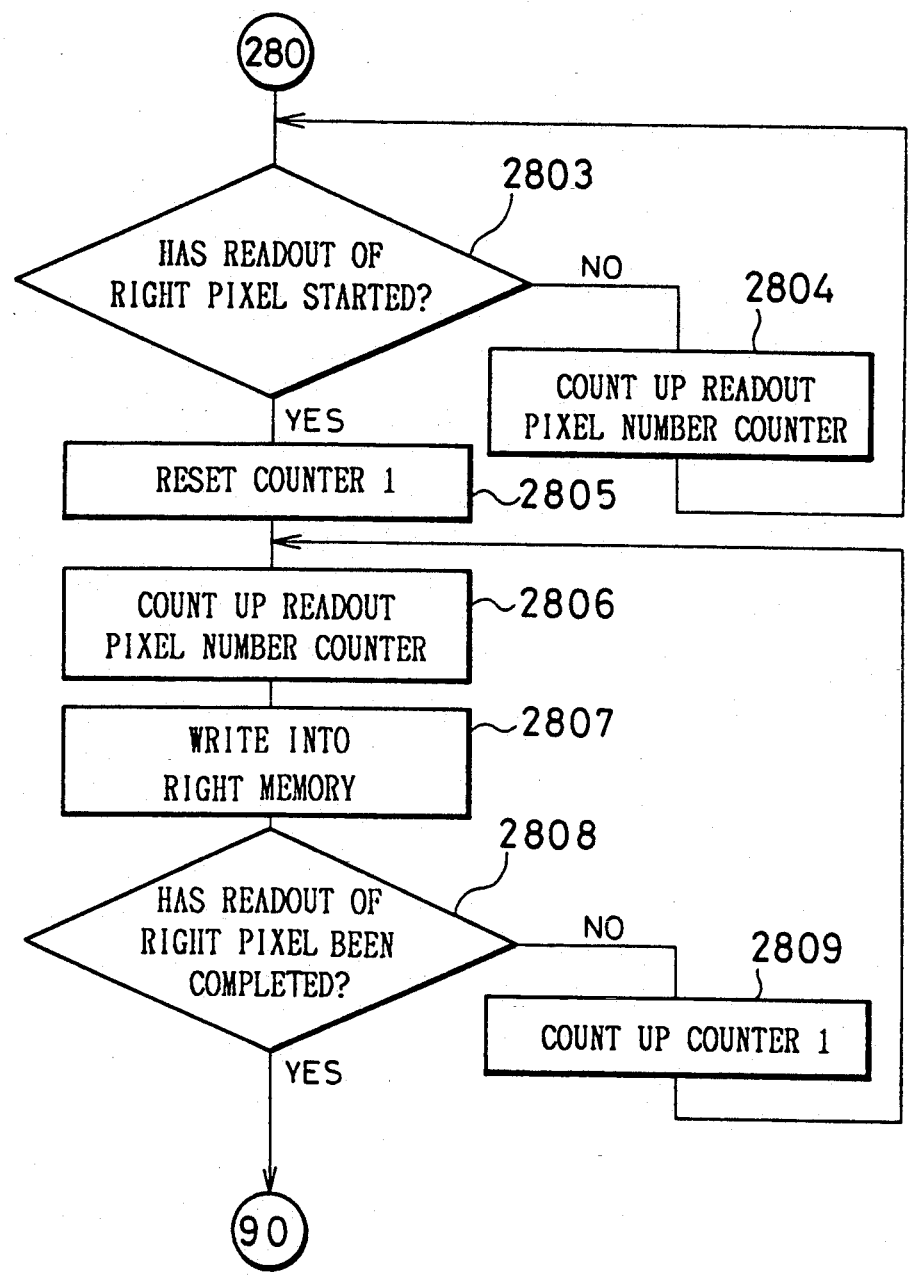
FIG. 28 is a flow chart of the routine to write the data obtained from the line sensor of FIG. 24, particularly from the right section thereof, into the zero-cross memory circuit.
Figure 29:
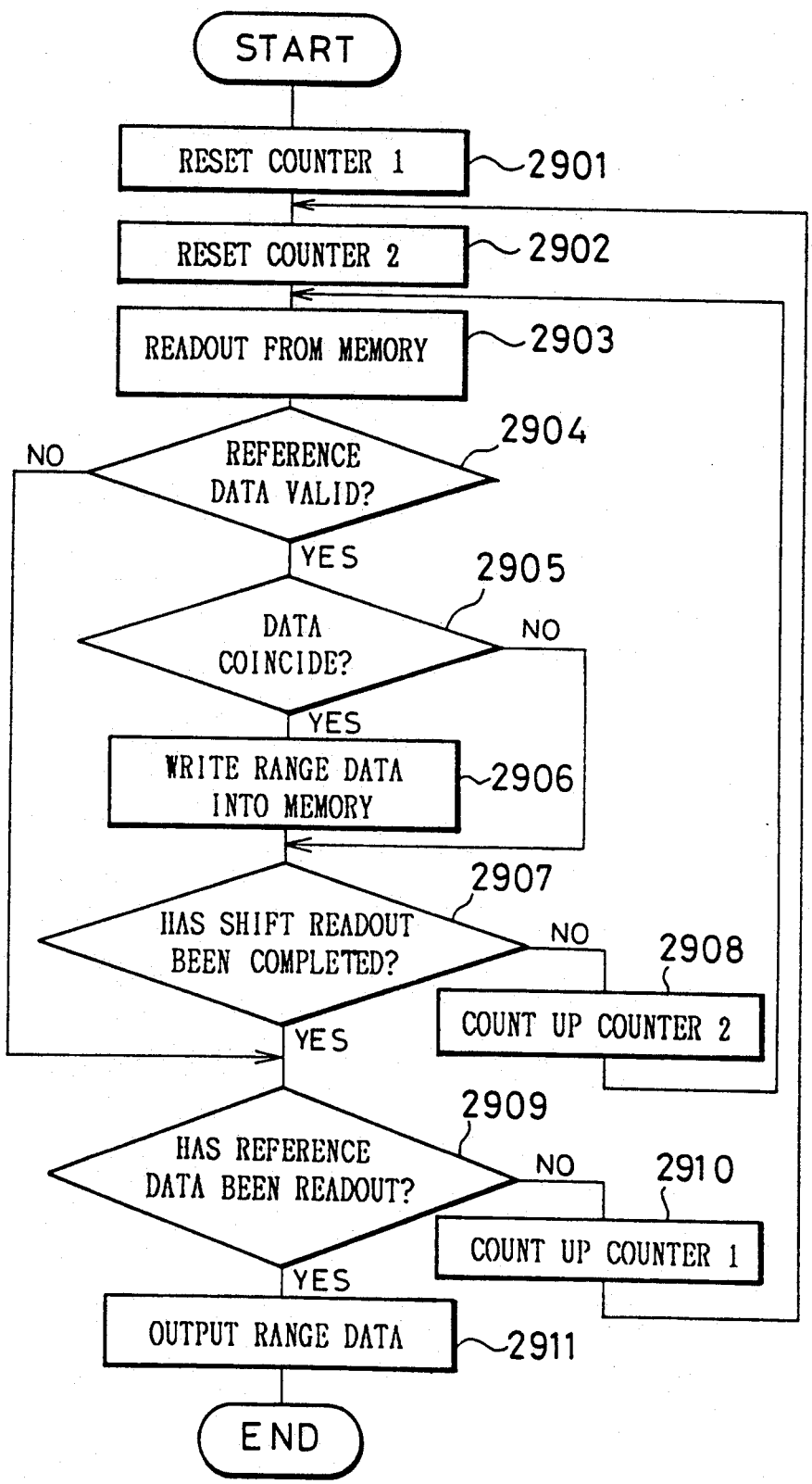
FIG. 29 is a flow chart of the routine used in Embodiment 3 to read given data from the zero-cross memory circuits in order to detect a coincidence of the data stored in said zero-cross memory circuits.

A routine of FIG. 29 is executed after the previously mentioned routine of FIG. 8 has been executed for the arrangement comprising three line sensors 10b, 20b, 30b as Embodiments 1.1 through 1.8 or after the routine of FIGS. 26 through 28 has been executed for the arrangement comprising a single line sensor 8 as Embodiment 2.

It should be noted here that the data written into the zero-cross memory circuits 14, 24, 34 (step 805) and the data written into the zero-cross memory circuits 14, 24, 34 (step 2608, step 2707, step 2807) are stored in the addresses corresponding to the respective pixels, according to:

$$ADDRESS = COUNTER\ 1 \quad (18)$$

for the central memory circuit 14, $$ADDRESS = COUNTER\ 1 \quad (19)$$

for the right side memory circuit 24, and $$ADDRESS = COUNTER\ 1 \quad (20)$$

for the left side memory circuit 34.

Upon start of the routine shown by FIG. 29, a step 2901 resets the first counter 50 and then the routine proceeds to a step 2902 to reset the second counter 60. The stored data are read-out from the zero-cross memory circuits 14, 24, 34 according to the addresses as will be described later (step 2903) and it is determined whether the data stored in the address of the zero-cross memory circuit (i.e., central zero-cross memory circuit 14) as a reference is valid or not (step 2904). If conclusion of the step 2904 is NO, no comparison of this reference data is performed and the routine proceeds to a step 2909.

If conclusion of said step 2904 is YES, it is then determined whether the data read-out from respective one address of the zero-cross memory circuits 14, 24, 34 coincidence or not (step 2905). If a coincidence of the data is concluded, the routine proceeds to a step 2906 to write a current value (COUNTER 1) of the first counter 50 as an address data and a current value (COUNTER 2) of the second counter 60 as a range data into the data memory circuit 80. If conclusion of said step 2905 is NO, the routine proceeds to a step 2907 to determine whether all the address for the data in both the right side zero-cross memory circuit 24 and the left side zero-cross memory circuit 34 have been shifted and read-out or not. If NO, the routine proceeds to a step 2908 to count up the second counter 60 and then returns to the step 2903 to run the steps through 2907.

If said step 2907 concludes YES, the routine proceeds to a step 2909 to determine whether the data in all the address of the central zero-cross memory circuit 14 have been read-out. If NO, the routine proceeds to a step 2910 to count up the first counter 50 and then returns to the step 2902 to repeat the steps 2902 through 2909.

At the step 2903 through 2909, the first counter 50 and the address computing circuit 25, 35 are used to read the stored data according to the following equations corresponding to the previously mentioned equations (18), (19) and (20):

$$ADDRESS = COUNTER\ 1 \quad (21)$$

for the central zero-cross memory circuit 14, $$ADDRESS = COUNTER\ 1 + COUNTER\ 2 \quad (22)$$

for the right side zero-cross memory circuit 24, and $$ADDRESS = COUNTER\ 1 + S - COUNTER\ 2 \quad (23)$$

for the left side zero-cross memory circuit 34. In the equation (23), S represents a constant. Between write-in address and read-out address there is established a relationship as will be described below in reference with FIGS. 30 and 31.

FIG. 30(a) corresponds to a state in which the count signal of the first counter 50 is 0 (COUNTER 1=0) and the steps 2903 through 2908 have been executed. More specifically, the data stored in the address 0 of the central zero-cross memory circuit 14, the data stored in the addresses 0 through S of the right side zero-cross memory circuit 24 and the data stored in the addresses S through 0 of the left side zero-cross memory circuit 34 are compared with one another while the second counter 60 is successively incremented from 0 to S and thereby a coincidence of these data is detected. After the data stored in all the addresses of the right and left side zero-cross memory circuits 24, 34 have been compared with the data stored in the address 0 of the central zero-cross memory circuit 14, the first counter 50 is incremented up to 1 (COUNTER 1=1)(step 2910), then, as shown by FIG. 30(b), the data stored in the address 1 of the central zero-cross memory circuit 14, the data stored in the addresses 1 through (S+1) of the right side zero-cross memory circuit 24 and the data stored in the addresses (S+1) through 1 of the left side zero-cross memory circuit 34 are compared with one another while the second counter 60 is successively incremented from 0 up to S and thereby a coincidence of these data is detected. Thus, the coincidence detection is performed with the data stored in the right side zero-cross memory circuit 24 and the left side zero-cross memory circuit 34 being successively shifted by one pixel at a time relative to the data stored in one address of the central zero-cross memory circuit 14. If no zero-cross point is present in said one address of the central zero-cross memory circuit 14, no comparison will occur with the data in said one address (conclusion of the step 2904 is NO).

Such operation of coincidence detection is repeated while the first counter 50 is incremented (step 2910) until the count signal of said first counter 50 reaches COUNTER 1=W−1. FIG. 31(a) corresponds to a state of COUNTER 1=W−2 and FIG. 31(b) corresponds to a state of COUNTER 1=W−1.

In the above-mentioned comparative operation, it is determined whether the data stored in said one address of the central zero-cross memory circuit 14 involves a scene to be photographed, which will provide any range data, or not (step 2904) and, if the scene is involved, a range to said scene will be obtained while the second counter 60 is successively incremented.

The value of the second counter 60 at the moment of zero-cross coincidence between the data stored in the respective zero-cross memory circuits 14, 24, 34 corresponds the displacement Xp in the previously mentioned equation (6) and this displacement is stored in the data memory circuit 80 as a range data (step 2906).

If said step 2909 determines that read-out of the reference data has been completed, the routine proceeds to a step 2911 and the range data written into the data memory circuit 80 (step 2906) is applied to objective driving means (not shown) so that the objective is moved to a position at which the camera is focused on the scene to be photographed.

The instant Embodiment 3 allows the operation to be simplified and thereby the operation speed to be further improved, since it is determined whether the data stored in one address which was read from the reference data is valid to acquire the range data or not and, if a validity is confirmed, a range to the scene available for acquisition of said range data is measured.

EFFECT OF THE INVENTION

As will be apparent from the foregoing description, the range finder for passive type autofocussing device of the present invention is so arranged that a luminance on a scene to be photographed is picked up by three line sensors, secondary differences are computed from the luminance data, three zero-cross data characterizing zero-cross points of said respective secondary differences are stored, said three zero-cross data are compared with one another to detect a zero-cross coincidence of these three data with one of said three zero-cross data being selected as a reference data and the other two zero-cross data being successively shifted by one pixel at a time. Such arrangement improves the operation speed over the conventional arrangement adapted to obtain the range data by correlative operation. In this way, the present invention allows a dynamic scene or object to be photographed to be reliably picked up and to be rapidly brought into focus.

In addition, the present invention allows the range data to be obtained with high precision, since the zero-cross data of secondary differences are compared with one another independently of luminance distribution patter presented by the scene on the line sensors.

What is claimed is:

1. A range finder for a passive type autofocussing device, said range finder comprising:
   three photosensors to pick up a luminance distribution on a scene to be photographed;
   secondary difference computing circuits coupled to said photosensors to compute secondary differences of output signals from said respective photosensors;
   zero-cross detecting circuits coupled to said secondary difference computing circuits to detect zero-cross points of output signals from said respective secondary difference computing circuits;
   zero-cross memory circuits coupled to said zero-cross detecting circuits, said respective zero-cross memory circuits storing zero-cross behavior signals obtained by said respective zero-cross detecting circuits; and
   a coincidence detecting circuit adapted to compare the zero-cross behavior signals stored in said respective zero-cross memory circuits with one another and thereby to detect a coincidence of these zero-cross behavior signals, wherein one of said three photosensors is selected as a reference photosensor and the zero-cross behavior signals obtained from the other two photosensors are successively shifted relative to the zero-cross behavior signal obtained from said reference photosensor until a coincidence of these zero-cross behavior signals is detected by said coincidence detecting circuit and a range to the scene is computed from an amount of said shifting.

2. The range finder for a passive type autofocussing device as recited in claim 1, wherein each said zero-cross detecting circuit is adapted to detect the zero-cross point of the output signal from each said secondary difference computing circuit discriminatively in the case of positive-to-negative and in the case of negative-to-positive change.

3. The range finder for a passive type autofocussing device as recited in claim 1, wherein each said zero-crossing detecting circuit is adapted to determine that the output signal from each said secondary difference computing circuit has zero-crossed if said output signal of each said secondary difference computing circuit has changed over non-adjacent level zones of three or more level zones including two or more levels across the zero level and to detect the zero-cross point of said output signal of each said secondary difference computing circuit discriminatively in the case of positive-to-negative change and in the case of negative-to-positive change.

4. The range finder for a passive type autofocussing device as recited in claim 1, wherein each said zero-cross detecting circuit is adapted to determine whether the output signal of each said secondary difference computing circuit is in positive or negative state across the zero level, to determine that said output signal of each of said secondary difference computing circuit has zero-crossed if said output signal of each said secondary difference computing circuit has changed from one state to the other state after said one state lasted for a period corresponding to a predetermined number of pixels in the associated photosensor, and to detect the zero-cross point of said output signal from each said secondary difference computing circuit discriminatively in the case of positive-to-negative change and in the case of negative-to-positive change.

5. The range finder for a passive type autofocussing device as recited in claim 1, wherein each said said zero-cross detecting circuit is adapted to determine that the output signal of each said secondary difference computing circuit has zero-crossed if said output signal of each said secondary difference computing circuit has changed over non-adjacent level zones of three or more level zones including two or more levels across the zero level within a period corresponding to a predetermined number of pixels of the associated photosensor and to detect the zero-cross point of said output signal of each said secondary difference computing circuit discriminatively in the case of positive-to-negative change and in the case of negative-to-positive change.

6. A range finder for a passive autofocussing device, said range finder comprising:
   a photosensor to pick up a luminance distribution on a scene to be photographed, said photosensor consisting of a single line sensor divided into three sections and three imaging lenses adapted to image the scene on the respective sections of the line sensor;
   a single secondary difference computing circuit coupled to said line sensor to compute a secondary difference of an output signal from said line sensor;
   a single zero-cross detecting circuit coupled to said secondary difference computing circuit to detect zero-cross points of an output signal from said secondary difference computing circuit;
   zero-cross memory circuits associated with said three sections of said line sensor, respectively, to store zero-cross behavior signals obtained by said zero-cross detecting circuit; and
   a coincidence detecting circuit adapted to compare the zero-cross behavior signals stored in said respective zero-cross memory circuits and thereby to detect a coincidence of these zero-cross behavior signals, wherein one of said three line sensor sections is selected as a reference line sensor section and the zero-cross behavior signal obtained from the other two line sensor sections are successively shifted relative to the zero-cross behavior signal obtained from said reference line sensor section until a coincidence of these zero-cross behavior signals is detected by said coincidence detecting circuit and a range to the scene is computed from an amount of said shifting.

7. The range finder for a passive type autofocussing device as recited in claim 6, wherein said single zero-cross detecting circuit is adapted to detect the zero-cross points of the output signal from said single secondary difference computing circuit discriminatively in the case of positive-to-negative change and in the case of negative-to-positive change.

8. The range finder for a passive type autofocussing device as recited in claim 6, wherein said single zero-cross detecting circuit is adapted to determine that the output signal from said single secondary difference computing circuit has zero-crossed if said output signal of said secondary difference computing circuit has changed over non-adjacent level zones of three or more level zones including two or more levels across the zero level and to detect the zero-cross point of said output signal of said secondary difference computing circuit discriminatively in the case of positive-to-negative change and in the case of negative-to-positive change.

9. The range finder for a passive type autofocussing device as recited in claim 6, wherein said single zero-cross detecting circuit is adapted to determine whether the output signal of said single secondary difference computing circuit is in positive or negative state across the zero level, to determine that said output signal of said secondary difference computing circuit has zero-crossed if said output signal of said secondary difference computing circuit has changed from one state to the other state after said one state lasted for a period corresponding to a predetermined number of pixels of said photosensor, and to detect the zero-cross point of said output signal of said secondary difference computing circuit discriminatively in the case of positive-to-negative change and in the case of negative-to-positive change.

10. The range finder for a passive type autofocussing device as recited in claim 6, wherein said single zero-cross detecting circuit is adapted to determine that the output signal of said single secondary difference computing circuit has zero-crossed if said output signal of said secondary difference computing circuit has changed over non-adjacent level zones of three or more level zones including two or more levels across the zero level within a period corresponding to a predetermined number of pixels of said photosensor and to detect the zero-cross point of said output signal of said secondary difference computing circuit discriminatively in the case of positive-to-negative change and in the case of negative-to-positive change.

11. The range finder for a passive type autofocussing device, the range finder comprising:
three photosensors to pick up a luminance distribution on a scene to be photographed;
characteristic point detecting means coupled to said three photosensors to detect characteristic points of output signals of said three photosensors corresponding to said luminance distribution; and
coincidence detecting means coupled to said characteristic point detecting means to detect a coincidence of the characteristic point data detected by said characteristic point detecting means in association with the respective photosensors, wherein the characteristic point data associated with one of said three photosensors is selected as a reference data and the characteristic point data associated with the other two photosensors are successively shifted relative to said reference data to detect a coincidence of the characteristic point data associated with said three photosensors so as to compute a range to said scene based on an amount that the characteristic point data associated with said other two photosensors have been shifted until the coincidence of the three characteristic point data occurs.

12. The method of range finding for a passive type autofocussing device comprising the steps of:
picking up a luminance distribution on a scene to be photographed by three photosensors;
detecting characteristic points of output signals of said three photosensors corresponding to said luminance distribution;
storing said characteristic points in addresses corresponding to pixel positions of the respective photosensors;
selecting the characteristic point data associated with one of said three photosensors as a reference data;
detecting a coincidence of the characteristic point data associated with said three photosensors while the characteristic point data associated with the other two photosensors are successively shifted relative to said reference data; and
computing a range to said scene based on an amount that the characteristic point data associated with said other two photosensors have been shifted until the coincidence of the three characteristic point data occurs.

13. Range finder for passive type autofocussing device, said range finder comprising three photosensors to pick up a luminance distribution on a scene to be photographed, secondary difference computing circuits to compute secondary differences of output signals from said respective photosensors, zero-cross detecting circuits to detect zero-cross points of output signals from said respective secondary difference computing circuits, zero-cross memory circuits to store zero-cross behavior signals obtained by said respective zero-cross detecting circuits in addresses assigned in association with said three photosensors, respectively, and a coincidence detecting circuit adapted to compare the zero-cross behavior signals stored in said respective zero-cross memory circuits with one another and thereby to a detect a coincidence of these zero-cross behavior signals, wherein one of said three photosensors is selected as a reference photosensor; a data stored in one address of the zero-cross memory circuit associated with said reference photosensor is read-out; if this data is a valid data including a zero-cross point, data stored in the other zero-cross memory circuits are read-out while the addresses are shifted by one at a time to compare these three data; such comparison of the these three data is successively performed with respect to all the addresses of said zero-cross memory circuit associated with the reference photosensor; and a range to the scene is computed based on the addresses of data stored in said other two memory circuits coinciding with the data stored in said zero-cross memory circuit associated with said reference photosensor.

14. Range finder for passive type autofocussing device as recited in claim 13, wherein each said zero-cross detecting circuit is adapted to detect the zero-cross point of the output signal from each said secondary difference computing circuit discriminatively in the case of positive-to-negative change and in the case of negative-to-positive change.

15. Range finder for passive type autofocussing device as recited in claim 13, wherein each said zero-cross detecting circuit is adapted to determine that the output signal of each said secondary difference computing circuit has zero-crossed if said output signal has changed over non-adjacent level zones of three level zones including two or more levels across the zero level and to detect the zero-cross point of said output signal discriminatively in the case of positive-to-negative change and in the case of negative-to-positive change.

16. Range finder for passive type autofocussing device as recited in claim 13, wherein each said zero-cross detecting circuit is adapted to determine whether the output signal of each said secondary difference computing circuit is in positive or negative state across the zero level, to determine that said output signal has zero-crossed if said output signal has changed from one state to the other state after said one state lasted for a period corresponding to a predetermined number of pixels in the associated photosensor, and to detect the zero-cross point of said output signal discriminatively in the case of positive-to-negative change and in the case of negative-to-positive change.

17. Range finder for passive type autofocussing device as recited in claim 13, wherein each said zero-cross detecting circuit is adapted to determine that the output signal of each said secondary difference computing circuit has zero-crossed if said output signal has changed over non-adjacent level zones of three or more level zones including two or more levels across the zero level within a period corresponding to a predetermined number of pixels of the associated photosensor and to detect the zero-cross point of said output signal discriminatively in the case of positive-to-negative change and in the case of negative-to-positive change.

18. Range finder for passive type autofocussing device, said range finder comprising a photosensor to pick up a luminance distribution on a scene to be photographed, said photosensor consisting of a single line sensor divided into three sections and three imaging lenses adapted to image the object on the respective sections of the line sensor, a single secondary difference computing circuit to compute a secondary difference of an output signal from said line sensor, a single zero-cross detecting circuit to detect zero-cross points of an output signal from said secondary difference computing circuit, zero-cross memory circuits associated with said three sections of said line sensor, respectively, to store zero-cross behavior signals obtained by said zero-cross detecting circuit, and a coincidence detecting circuit adapted to compare the zero-cross behavior signals stored in said respective zero-cross memory circuits and thereby to detect a coincidence of these zero-cross behavior signals, wherein one of said three line sensor sections is selected as a reference line sensor section; a data stored in one address of the zero-cross memory circuit associated with said reference line sensor section is read-out; if this data is a valid data including a zero-cross point, data stored in the other zero-cross memory circuits are read-out while the addresses are shifted by one at a time to compare these three data; such comparison of these three data is successively performed with respect to all the addresses of said zero-cross memory circuit associated with the reference line sensor section; and a range to the scene is computed based on the addresses of data stored in said other two memory circuit coincidence with the data stored in said zero-cross memory circuit associated with said reference line sensor section.

19. Range finder for passive type autofocussing device as recited in claim 18, wherein said single zero-cross detecting circuit is adapted to detect the zero-cross points of the output signal from said single secondary difference computing circuit discriminatively in the case of positive-to-negative change and in the case of negative-to-positive change.

20. Range finder for passive type autofocussing device as recited in claim 16, wherein said single zero-cross detecting circuit is adapted to determine that the output signal from said single secondary difference computing circuit has zero-crossed if said output signal has changed over non-adjacent level zones of three or more level zones including two or more levels across the zero level and to detect the zero-cross point of said output signal discriminatively in the case of positive-to-negative change and in the case of negative-to-positive change.

21. Range finder for passive type autofocussing device as recited in claim 18, wherein said single zero-cross detecting circuit is adapted to determine whether the output signal of said single secondary difference computing circuit is in positive or negative state across the zero level, to determine that said output signal has zero-crossed if said output signal has changed from one state to the other state after said one state lasted for a period corresponding to a predetermined number of pixels of said photosensor, and to detect the zero-cross point of said output signal discriminatively in the case of positive-to-negative change and in the case of negative-to-positive change.

22. Range finder for passive type autofocussing device as recited in claim 18, wherein said single zero-cross detecting circuit is adapted to determine that the output signal of said single secondary difference computing circuit has zero-crossed if said output signal has changed over non-adjacent level zones of three or more level zones including two or more levels across the zero level within a period corresponding to a predetermined number of pixels of said photosensor and to detect the zero-cross point of said output signal discriminatively in the case of positive-to-negative change and in the case of negative-to-positive change.

* * * * *

UNITED STATES PATENT AND TRADEMARK OFFICE
CERTIFICATE OF CORRECTION

PATENT NO. : 5,274,415
DATED : December 28, 1993
INVENTOR(S) : Minoru Ishiguro

It is certified that error appears in the above-indentified patent and that said Letters Patent is hereby corrected as shown below:

Column 7, line 55:
"Vin(n-1)+Vin(n))" should be
--* (Vin(n-1)-2 * Vin(n-1)+Vin(n))--.

Column 7, line 61:
"(e)" should be --(c)--.

Column 10, line 24:
"56" should be --50--.

Column 11, lines 23, 26, 30, and 32:
"z" should be --$\underline{z}$--.

Column 12, lines 1, 8, 10, 60, and 68:
"p" should be --$\underline{p}$--.

Column 12, lines 4, 8, 11, 65, and 68:
"n" should be --$\underline{n}$--.

Column 12, lines 63 and 68:
"z" should be --$\underline{z}$--.

Column 13, lines 3, 4, and 68:
"z" should be --$\underline{z}$--.

Column 13, line 3:
"n" should be --$\underline{n}$--.

Column 13, line 5:
"p" should be --$\underline{p}$--.

Column 14, lines 3, 11, 18, and 53:
"z" should be --$\underline{z}$--.

UNITED STATES PATENT AND TRADEMARK OFFICE
CERTIFICATE OF CORRECTION

PATENT NO. : 5,274,415
DATED : December 28, 1993
INVENTOR(S) : Minoru Ishiguro

It is certified that error appears in the above-indentified patent and that said Letters Patent is hereby corrected as shown below:

Column 15, line 1:
        "z" should be --$\underline{z}$--.

Column 15, lines 58, 64, and 68:
        "p" should be --$\underline{p}$--.

Column 15, lines 61, 64, and 66:
        "n" should be --$\underline{n}$--.

Column 16, line 4:
        "p" should be --$\underline{p}$-- (both occurrences).

Column 16, lines 6, 9, 55, 57, and 60:
        "n" should be --$\underline{n}$--.

Column 16, lines 48, 57, and 65:
        "p" should be --$\underline{p}$--.

Column 16, lines 51, 57, 59, 62, 65, and 67:
        "z" should be --$\underline{z}$--.

Column 18, line 6:
        "sensor 110" should be --sensor 10--.

UNITED STATES PATENT AND TRADEMARK OFFICE
CERTIFICATE OF CORRECTION

PATENT NO. : 5,274,415
DATED : December 28, 1993
INVENTOR(S) : Minoru Ishiguro

It is certified that error appears in the above-indentified patent and that said Letters Patent is hereby corrected as shown below:

Column 20, lines 21 and 22:
   "sensor 6" should be --sensor 8--.

Column 28, claim 20, line 23:
   "Claim 16" should be --Claim 18--.

Signed and Sealed this

Thirteenth Day of September, 1994

Attest:

BRUCE LEHMAN

Attesting Officer    Commissioner of Patents and Trademarks